United States Patent
DiMaria et al.

(10) Patent No.: US 11,553,089 B2
(45) Date of Patent: *Jan. 10, 2023

(54) SYSTEM AND METHOD FOR MOBILE DEVICE ACTIVE CALLBACK PRIORITIZATION

(71) Applicant: Virtual Hold Technology Solutions, LLC

(72) Inventors: Matthew DiMaria, Brentwood, TN (US); Matthew Donaldson Moller, Petaluma, CA (US); Shannon Lekas, Cushing, TX (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,918

(22) Filed: May 23, 2022

(65) Prior Publication Data

US 2022/0279070 A1 Sep. 1, 2022

Related U.S. Application Data

(63) Continuation-in-part of application No. 17/572,405, filed on Jan. 10, 2022, which is a continuation of (Continued)

(51) Int. Cl.
*G06F 15/16* (2006.01)
*G06F 15/173* (2006.01)
(Continued)

(52) U.S. Cl.
CPC ...... *H04M 3/5231* (2013.01); *H04L 47/6275* (2013.01); *H04L 67/60* (2022.05);
(Continued)

(58) Field of Classification Search
CPC .............. H04M 3/5231; H04M 3/5191; H04L 47/6275; H04L 67/60; H04L 45/08; H04W 4/16
(Continued)

(56) References Cited

U.S. PATENT DOCUMENTS 10,582,060 B1 3/2020 Merritt
2006/0256949 A1 11/2006 Noble
(Continued)

*Primary Examiner* — Karen C Tang
(74) *Attorney, Agent, or Firm* — Galvin Patent Law LLC; Brian R. Galvin; Brian S. Boon

(57) ABSTRACT

A system and methods for mobile device active callback prioritization, utilizing an enhanced callback prioritization engine operating on a user's mobile device for integration through the operating system and software applications operating on the device, wherein the enhanced callback prioritization engine receives intercepted data or voice messages sent to the mobile device, retrieves and aggregates data related to the assigned messages, inputs the assigned data message and aggregate data into one or more machine learning algorithms wherein the algorithms may analyze the input data, the results of the analysis may be used to compute a priority score for the assigned data message, and generates a callback list from the computed prioritization score. The priority score is in part based on 3rd party application data related to the data or voice messages providing context to the machine learning algorithms.

12 Claims, 17 Drawing Sheets

Related U.S. Application Data application No. 17/389,837, filed on Jul. 30, 2021, now Pat. No. 11,223,725, which is a continuation of application No. 16/985,093, filed on Aug. 4, 2020, which is a continuation of application No. 16/583,967, filed on Sep. 26, 2019, now Pat. No. 10,735,589, which is a continuation-in-part of application No. 16/542,577, filed on Aug. 16, 2019, now Pat. No. 10,609,218, said application No. 17/389,837 is a continuation of application No. 16/523,501, filed on Jul. 26, 2019, now Pat. No. 11,146,517, which is a continuation of application No. 15/411,424, filed on Jan. 20, 2017, now Pat. No. 10,367,766.

(60) Provisional application No. 62/828,133, filed on Apr. 2, 2019, provisional application No. 62/820,190, filed on Mar. 18, 2019.

(51) Int. Cl.
*H04M 3/523* (2006.01)
*H04M 3/51* (2006.01)
*H04W 4/16* (2009.01)
*H04L 47/6275* (2022.01)
*H04L 67/60* (2022.01)
*H04L 45/02* (2022.01)

(52) U.S. Cl.
CPC ........... *H04M 3/5191* (2013.01); *H04W 4/16* (2013.01); *H04L 45/08* (2013.01)

(58) Field of Classification Search
USPC ........................................................ 709/224
See application file for complete search history.

(56) References Cited

U.S. PATENT DOCUMENTS

| | | | |
|---|---|---|---|
| 2013/0039483 A1* | 2/2013 | Wolfeld | H04M 3/00 379/265.03 |
| 2015/0189100 A1* | 7/2015 | Wang | H04M 19/041 455/414.1 |
| 2018/0063322 A1 | 3/2018 | Kim et al. | |

\* cited by examiner

SYSTEM AND METHOD FOR MOBILE DEVICE ACTIVE CALLBACK PRIORITIZATION

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/572,405
Ser. No. 17/389,837
Ser. No. 16/985,093
Ser. No. 16/583,967
62/828,133
Ser. No. 16/542,577
62/820,190
Ser. No. 16/523,501
Ser. No. 15/411,424

BACKGROUND OF THE INVENTION

Field of the Art

The disclosure relates to the field of mobile device technology, specifically to the field of integrating cloud-based callback management systems with onboard software on a mobile device.

Discussion of the State of the Art

Typically, if a client calls a business, voice prompt menu choices enable the calling client to identify an issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are frustrating to clients. It takes significant time to navigate the layered menus of voice prompts.

Second, waiting on-hold while a connection, be it a phone call, web chat, video conference, or other interaction type, is maintained in queue for connection to a service agent is also frustrating to clients.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative less frustrating, it does not address the inconvenience of having to navigate a slow and complicated voice prompt menu to enter the queue.

Additionally, as the gig economy compounds and people tend to get busier in the professional workplace, a solution is needed on their personal device to help prioritize returning communications with personal contacts, business relations, or solicitors.

What is needed is a system and various methods for providing integration of a cloud callback platform with mobile device software so that callback functionality and prioritization becomes a transparent and consistent feature across interaction modes through the mobile device ecosystem.

SUMMARY OF THE INVENTION

Accordingly, the inventor has conceived and reduced to practice, a system and methods for mobile device active callback prioritization, utilizing an enhanced callback prioritization engine operating on a user's mobile device for integration through the operating system and software applications operating on the device, wherein the enhanced callback prioritization engine receives intercepted data or voice messages sent to the mobile device, retrieves and aggregates data related to the assigned messages, inputs the assigned data message and aggregate data into one or more machine learning algorithms wherein the algorithms may analyze the input data, the results of the analysis may be used to compute a priority score for the assigned data message, and generates a callback list from the computed prioritization score. The priority score is in part based on $3^{rd}$ party application data related to the data or voice messages providing context to the machine learning algorithms.

According to a first preferred embodiment, a mobile device with active callback prioritization is disclosed, comprising: a processor, a memory, and a plurality of programming instructions stored in the memory and operable on the processor; a callback integration engine comprising a subset of the plurality of programming instructions that, when operating on the processor, cause the processor to: receive a data or voice message, the data or voice message comprising at least one characteristic; produce a callback object in memory comprising information associated with the data or voice message received; and send the callback object to an enhanced callback prioritization engine; and the enhanced callback prioritization engine comprising a subset of the plurality of programming instructions that, when operating on the processor, cause the processor to: receive the callback object from the callback integration engine; retrieve and aggregate application data related to the data or voice message; use the callback object and the aggregated application data as inputs into one or more machine learning algorithms, wherein the algorithms analyze the callback object's information and the aggregated application data to determine the context and urgency associated with the data or voice message; for each callback object, compute a priority score based at least upon the results of the analysis; and use the computed priority score, the callback object data, and the data or voice message to generate a callback list.

According to a second preferred embodiment, a method for active callback prioritization is disclosed, comprising the steps of: receiving a data or voice message, the data or voice message comprising at least one characteristic; producing a callback object in memory comprising information associated with the data or voice message received; retrieving and aggregating application data related to the data or voice message; using the callback object and the aggregated application data as inputs into one or more machine learning algorithms, wherein the algorithms analyze the callback object's information and the aggregated application data to determine the context and urgency associated with the data or voice message; for each callback object, computing a priority score based at least upon the results of the analysis; and using the computed priority score, the callback object data, and the data or voice message to generate a callback list.

According to various aspects: wherein the application data is retrieved using application programming interfaces; wherein the callback list comprises a smart reply message; wherein a user confirmed callback list is generated and executes the confirmed callback items on the list; wherein the application data comprises data from communication, social media, financial, gaming, and productivity applications; and wherein the machine learning algorithms comprise natural language processing.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
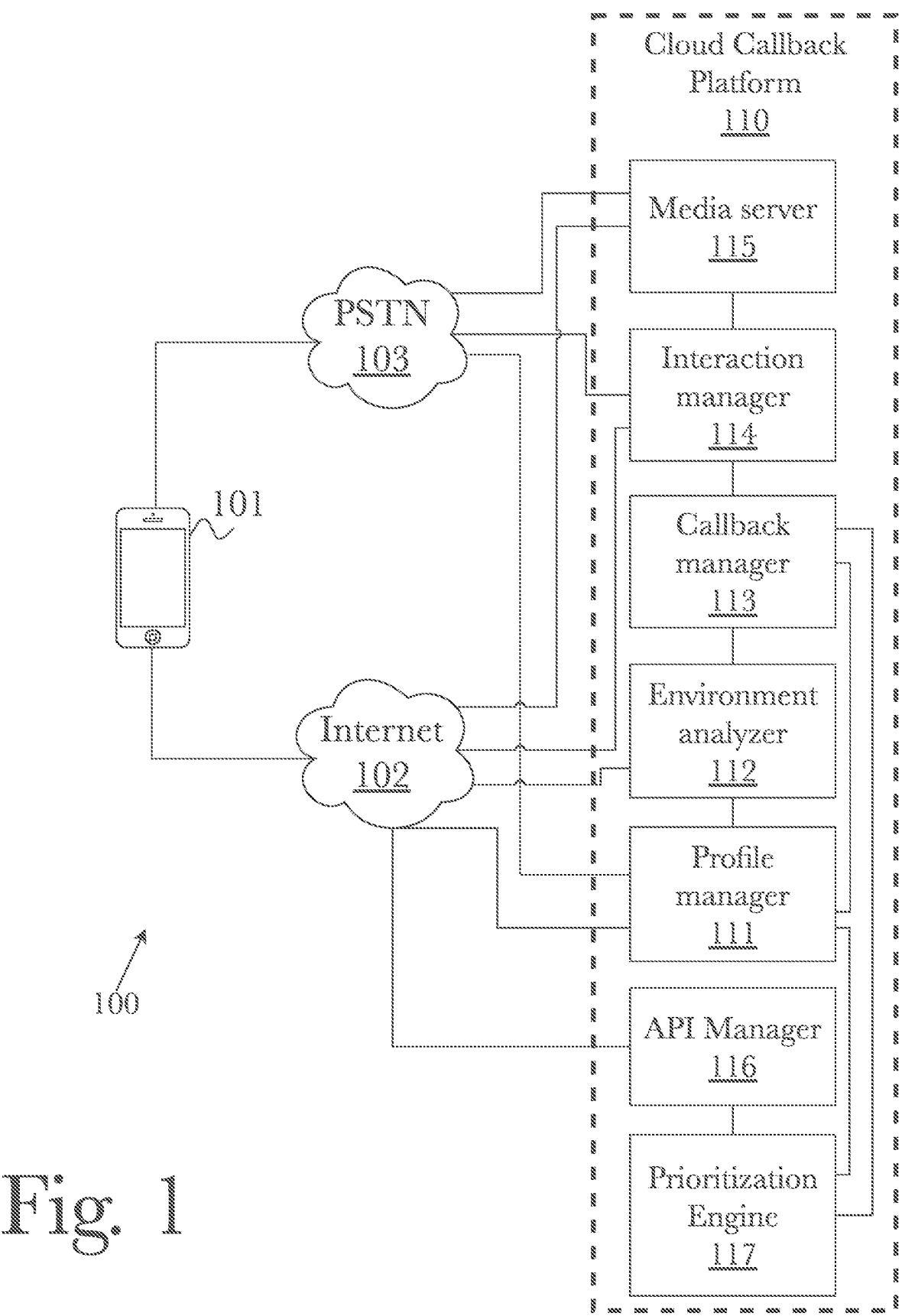
FIG. 1 is a block diagram illustrating an exemplary system architecture for a mobile device connected to a cloud callback platform via a public switch telephone network and the Internet, according to an embodiment.

The inventor has conceived, and reduced to practice, a system and methods for mobile device active callback prioritization, utilizing an enhanced callback prioritization engine operating on a user's mobile device for integration through the operating system and software applications operating on the device, wherein the enhanced callback prioritization engine receives intercepted data or voice messages sent to the mobile device, retrieves and aggregates data related to the assigned messages, inputs the assigned data message and aggregate data into one or more machine learning algorithms wherein the algorithms may analyze the input data, the results of the analysis may be used to compute a priority score for the assigned data message, and generates a callback list from the computed prioritization score. The priority score is in part based on $3^{rd}$ party application data related to the data or voice messages providing context to the machine learning algorithms.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to an instance of an individual being contacted after their initial contact was unsuccessful. For instance, if a first user calls a second user on a telephone, but the second user does not receive their call for one of numerous reasons including turning off their phone or simply not picking up, the second user may then place a callback to the first user once they realize they missed their call. This callback concept applies equally to many forms of interaction that need not be restricted to telephone calls, for example including (but not limited to) voice calls over a telephone line, video calls over a network connection, or live text-based chat such as web chat or short message service (SMS) texting. While a callback (and various associated components, methods, and operations taught herein) may also be used with an email communication despite the inherently asynchronous nature of email (participants may read and reply to emails at any time, and need not be interacting at the same time or while other participants are online or available), the preferred usage as taught herein refers to synchronous communication (that is, communication where participants are interacting at the same time, as with a phone call or chat conversation).

"Callback object" as used herein means a data object representing callback data, such as the identities and call information for a first and second user, the parameters for a callback including what time it shall be performed, and any other relevant data for a callback to be completed based on the data held by the callback object.

Conceptual Architecture

FIG. 1 is a block diagram illustrating an exemplary system architecture 100 for a mobile device 101 connected to a cloud callback platform 110 via a public switch telephone network 103 and the Internet 102, according to an embodiment. According to the embodiment, callback cloud 110 may receive requests via a plurality of communications networks such as a public switched telephone network (PSTN) 103 or the Internet 102. These requests may comprise a variety of communication and interaction types, for example including (but not limited to) voice calls over a telephone line, video calls over a network connection, or live text-based chat such as web chat or short message service (SMS) texting via PSTN 103. Such communications networks may be connected to a plurality of mobile devices 101 such as a user's smartphone or similar mobile device, according to the particular architecture of communication network involved. Mobile devices 101 may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 100 according to the invention.

When needed (for example, when a user manually requests a callback or when configured settings determine that a callback is needed), a user's mobile device 101 creates a session with a cloud callback platform 110 with a profile manager 111, resulting in a callback being required. Profile manager 111 receives initial requests to connect to callback cloud 110, and forwards relevant user profile information to a callback manager 113, which may further request environmental context data from an environment analyzer 112. Environmental context data may include (for example, and not limited to) recorded information about when a user may be suspected to be driving or commuting from work (as may be determined from device information, such as whether a "do not disturb while driving" feature has been enabled, or if the mobile device 101 is currently connected to a car audio system), or if the user may be busy for another reason, such as if they are running or working out (as may be determined from device sensor data), for example, and may be parsed from online profiles or online textual data, using an environment analyzer 112.

A callback manager 113 centrally manages all callback data, creating a callback object which may be used to manage the data for a particular callback, and communicates with an interaction manager 114 which handles requests to make calls and bridge calls, which go out to a media server 115 which actually makes the calls as requested. In this way, the media server 115 may be altered in the manner in which it makes and bridges calls when directed, but the callback manager 113 does not need to adjust itself, due to going through an intermediary component, the interaction manager 114, as an interface between the two. A media server 115, when directed, may place calls and send messages, emails, or connect voice over IP ("VoIP") calls and video calls, to users over a PSTN 103 or the Internet 102. Callback manager 113 may work with a user's profile as managed by a profile manager 111, with environmental context from an environment analyzer 112 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 114 to physically place and bridge the calls with a media server 115.

The cloud callback platform 110 may further include an application programming interface (API) manager 116 and a callback prioritization engine 117, according to an embodiment. The API manager 116 may be used to expose or connect with software related to a callback requester and a callback recipient. For example, API manager 116 may be used to connect with email, messaging, telephone, or other voice communication applications present on a mobile device in order to retrieve text-based data related to emails, text messages such as SMS and from other messaging applications, or voice data such as voicemails. Voice data such as, for example, a voice mail may be transcribed into a text-based data message by the cloud callback platform 110. The retrieved text-based data messages may be sent to a prioritization engine 117 which may identify one or more characteristics of the text-based data messages to route the data messages to an appropriate lobby. The prioritization engine 117 may use the environment analyzer to parse or analyze the retrieved text-based data messages. Analysis of the text-based data messages may be used to determine or infer a variety of metrics pertaining to a callback requester and at least one callback recipient, such as (but not limited to) relationships, intent, subject matter, and sentiment. Based on the analysis of the text-based data messages, the callback prioritization engine 117 may produce priority score for each text-based data message which can be used to order lobbies (callback groups) in order of priority.

Figure 2:
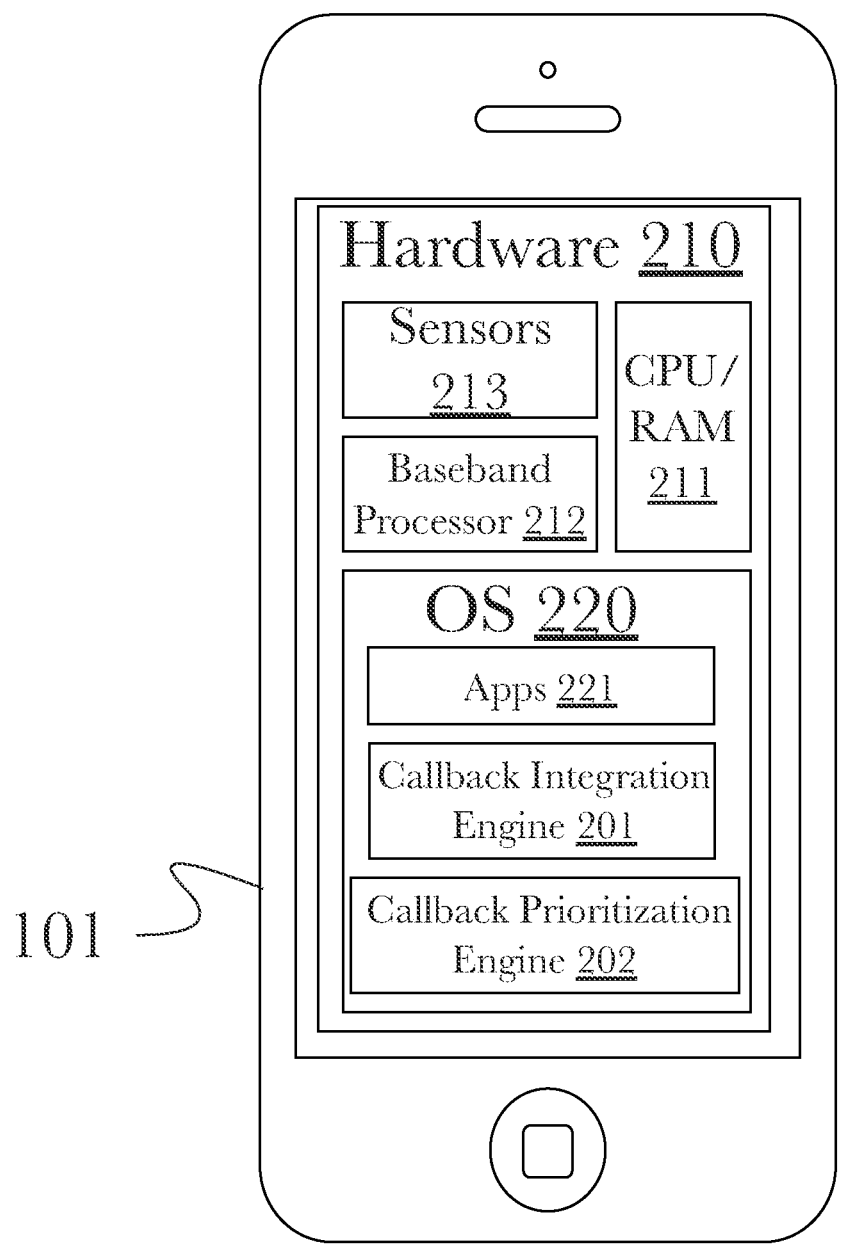
FIG. 2 is a block diagram illustrating an exemplary mobile device with a callback integration engine and callback prioritization engine operating at the operating system level, according to an embodiment.

FIG. 2 is a block diagram illustrating an exemplary mobile device 101 with a callback integration engine 201 and callback prioritization engine 202 operating at the operating system level, according to an embodiment. According to the embodiment, a mobile device 101 comprises several hardware and software components operating at various levels to provide various functions. At the most basic hardware level 210, the physical hardware of the mobile device 101 may comprise a processor and memory 211 that provide standard computing device functionality as described in detail below, with reference to FIGS. 14-17 (grouped together here for the sake of clarity, it should be appreciated that processor/memory may or may not be part of the same hardware component, such as a system-on-a-chip), a baseband processor 212 that manages radio-based communication functions such as cellular or Wi-Fi connectivity, as well as any of a number of hardware sensors 213 such as (for example, including but not limited to) an accelerometer to detect or measure device movement, gyroscope for detecting or measuring device orientation, barometer for measuring ambient environment conditions, or global positioning system (GPS) receiver for geolocating the device.

An operating system (OS) 220 comprises the main software operating on mobile device 101 and providing various software-based functions such as software applications and communications. Various software applications 221 operating within (for example in an application layer not shown here but as is commonly used in various computing devices according to the standard OSI process model of computing systems) on the mobile device 101 may expose and provide access to, or interaction with, various hardware and sensor features such as to enable a user to view or calibrate sensor readings.

According to the embodiment, a callback integration engine 201 may comprise local (that is, operating on the mobile device) functionality similar to a cloud-based callback manager 113 described above, and may operate as an application or feature at the operating system level 220, running at a similar privilege level and having similar access to hardware and software functions as other applications 221 operating on mobile device 101. This enables easy installation or removal of callback integration engine 201, as it may be readily distributed via similar methods as any other software application (for example, via an application store or similar download portal). However, this may restrict the capabilities of callback integration engine 201, as it will have only indirect access to hardware features (as it will only be able to access whatever features are exposed by the operating system) and in many cases may be "sandboxed", and prevented from directly accessing other software or information on the mobile device 201 (for example, in a sandboxed software environment such as APPLE IOS™ or similar).

According to the embodiment, a callback prioritization engine 202 may comprise local (that is, operating on the mobile device) functionality similar to a cloud-based prioritization engine 117 described above, and may operate as an application or feature at the operating system level 220, running at a similar privilege level and having similar access to hardware and software functions as other applications 221 operating on mobile device 101. The callback prioritization engine 202 may be included within the same application as the callback integration engine 201 or it may be packaged as it own application with built in functionality to communicate with and share data with a separate callback integration engine 201. This enables easy installation or removal of callback prioritization engine 202, as it may be readily distributed via similar methods as any other software application (for example, via an application store or similar download portal). However, this may restrict the capabilities of callback prioritization engine 202, as it will have only indirect access to hardware features (as it will only be able to access whatever features are exposed by the operating system) and in many cases may be "sandboxed", and prevented from directly accessing other software or information on the mobile device 201 (for example, in a sandboxed software environment such as APPLE IOS™ or similar).

Callback prioritization engine 202 may receive from the callback integration engine 201 a callback object associated with intercepted data or voice messages. Callback prioritization engine 202 may intercept (e.g., receive, hook, access, or otherwise obtain) voice messages (i.e., voicemail) and text-based data messages such as (but not limited to) short message service (SMS), emails, and group chats sent to the mobile device 101 and route them to an appropriate lobby (e.g., group) based upon at least one characteristic of the message. In an embodiment, the mobile device may transcribe voice messages into text-based data message for further processing. Each text-based data message and voice message (or its transcription) may have one or more characteristics, such as indications of source, destination, data message subject matter, end user identifiers or account identifiers. Once a data message has been assigned to a lobby other data associated with the data message may be aggregated and linked to the callback object. For example, a first email sent to a mobile device 101 may be intercepted and assigned to a lobby, and then the callback prioritization engine 202 can identify and retrieve other emails, text messages, or group chats associated with the first email in order to provide more context for the first email message. In this example, other communications exchanged between the first email recipient and the first email sender (such as an email thread, text messages, or voicemails) may be aggregated and added to the callback object associated with the first email. The aggregated data may then be fed into one or more machine learning algorithms that analyze the aggregated data and can generate for each data message in the lobby a priority score. The priority score may be used to create a hierarchy or priority list of callback objects such that each callback may be scheduled and executed in order of highest priority to lowest priority.

Figure 3:
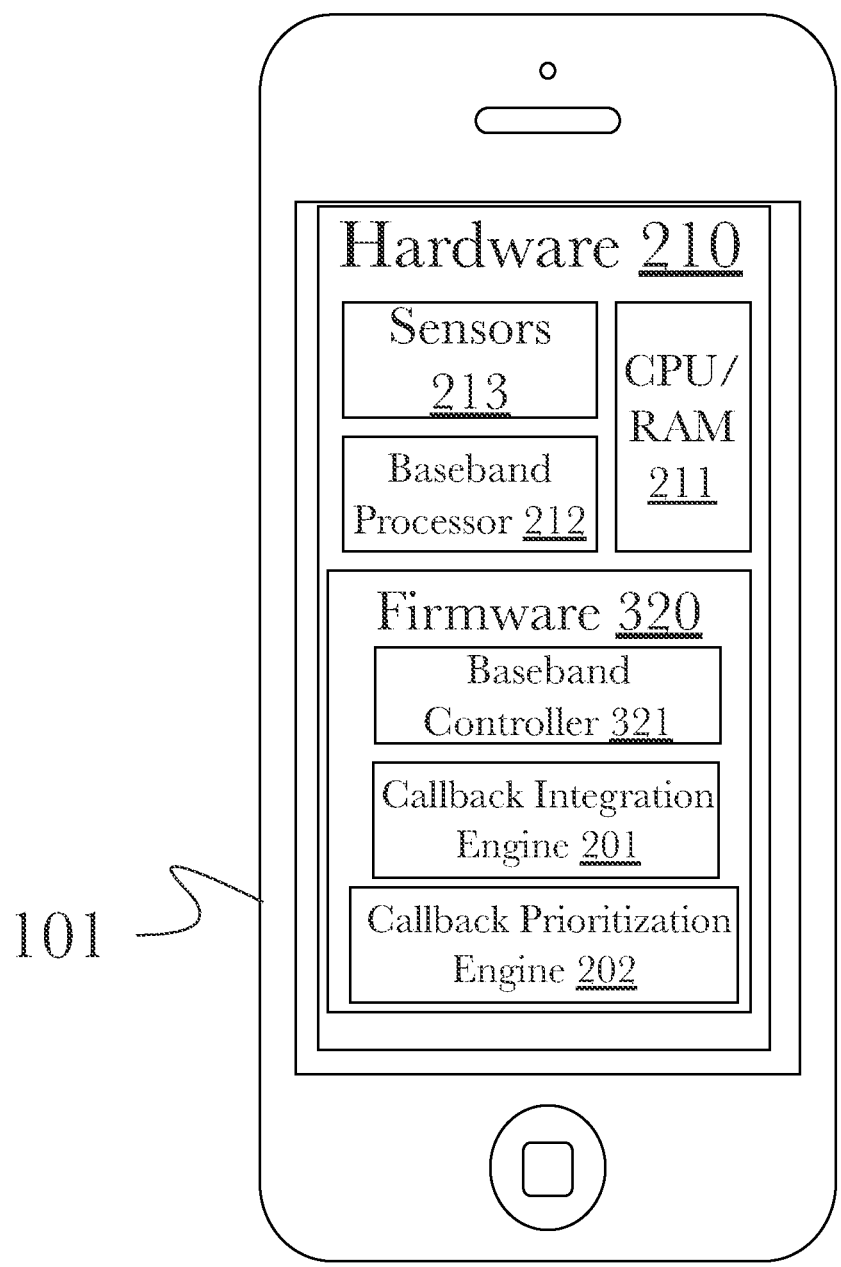
FIG. 3 is a block diagram illustrating an exemplary mobile device with a callback integration engine and callback prioritization engine operating at the device firmware level, according to an embodiment.

FIG. 3 is a block diagram illustrating an exemplary mobile device 101 with a callback integration engine 201 and callback prioritization engine 202 operating at the device firmware level, according to an embodiment. According to the embodiment, a firmware level 320 encompasses low-level program code that operates "below" the operating system 220, operating directly on hardware components of mobile 101, and comprises such features as a baseband controller 321 that controls features of baseband processor 212 and the operation of which is fully transparent to the user (that is, a user of mobile device 101 does not see or interact with firmware, and many users may not even be aware of its existence or capabilities).

According to the embodiment, a callback integration engine 201 and a callback prioritization engine 202 may operate as a firmware component that directly interfaces with hardware features of mobile device 101, enabling direct control as needed while exposing desired functionality to the operating system 220 in a transparent manner (that is, the operating system may only know that a feature is available, and may not be able to determine that the feature is provided by the callback integration engine 201 or callback prioritization engine 202 rather than, for example, the baseband controller 321). This enables more direct control over device functions, such as call and data message routing and hardware information such as sensor readings (as may be used in callback workflow processing), and allows the callback integration engine 201 to intercept incoming calls and radio information (e.g., data messages) before it reaches the operating system, so data may be manipulated and additional features may be integrated prior to presentation to the OS. This also prevents accidental removal of callback integration engine 201 and callback prioritization engine 202, as a user may have no control over device firmware and anything operating at or below the OS level 220 would inherently have insufficient access to modify firmware. This further enables callback integration engine 201 and callback prioritization engine 202 to access hardware features that may be restricted or completely prevented when operating within the OS layer 220, for example hardware sensor or geolocation information that may be incorporated into a callback workflow.

Figure 4:
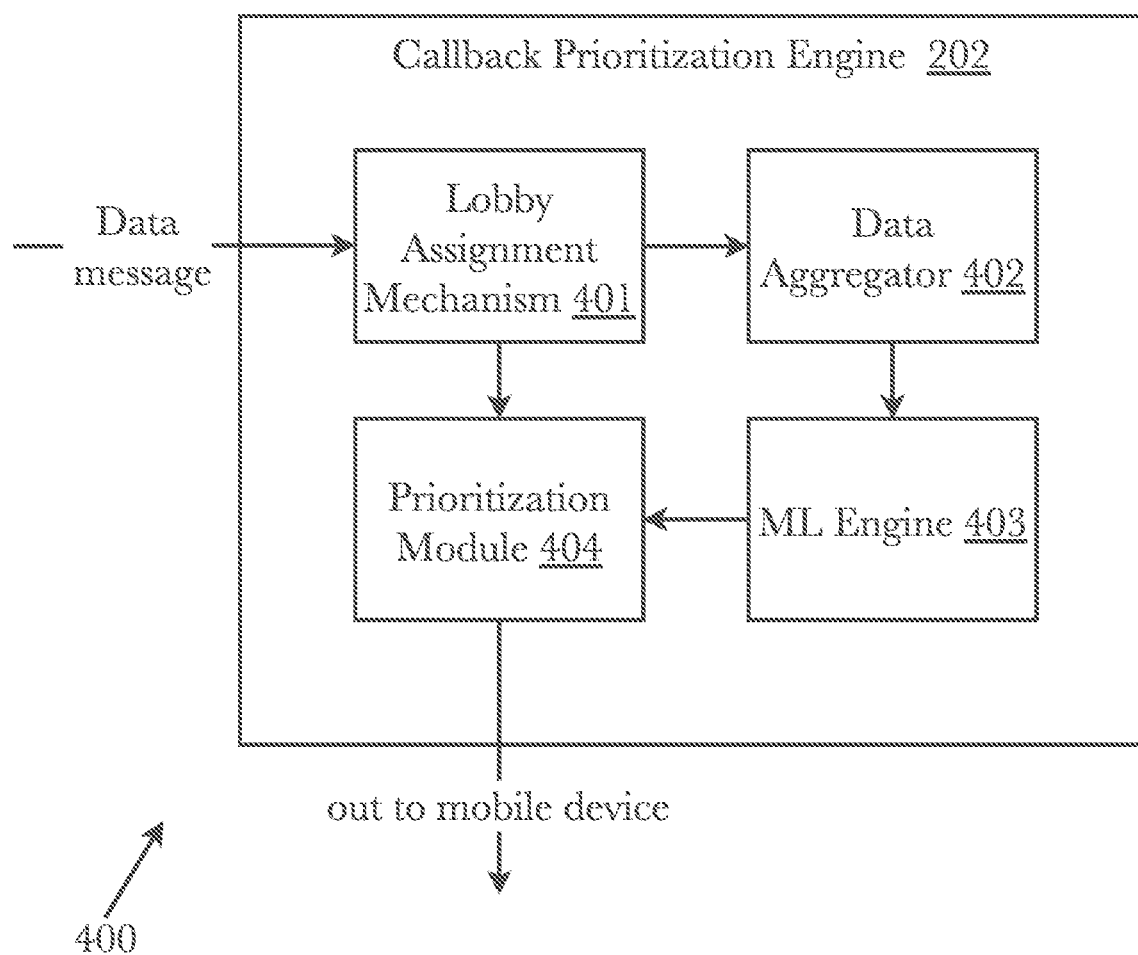
FIG. 4 is a block diagram illustrating an exemplary system architecture for a callback prioritization engine, according to an embodiment.

FIG. 4 is a block diagram illustrating an exemplary system architecture 400 for a callback prioritization engine 202, according to an embodiment. According to the embodiment, a callback prioritization engine 202 may receive a data message with a characteristic. The data message can part of sessions that include asynchronous text, voice message, or data message (e.g., not a live voice conversation such as a telephone call) communications between and end user and a computing device (e.g., mobile device, contact center agent [e.g., a person, bot, or combination thereof], etc.). In some examples, callback prioritization engine 202 can receive voice messages that have been send as audio messages (voicemail) or converted into text messages. The sessions can occur continuously in a conversational manner, or can be intermittent, e.g., lasting over hours, days or weeks with dormant periods between communications. The callback prioritization engine 202 may receive data messages and can identify characteristics of those data messages.

Based upon the characteristics of the data messages, the lobby assignment mechanism 401 can assign the data message to a default lobby construct (group) or can bypass the default lobby construct and instead assign the data message to the destination lobby construct. For example. The lobby assignment mechanism 401 can determine that the characteristics of a data message do not match or correlate to characteristics of other data messages that have been assigned to one or more destination constructs. When the lobby assignment mechanism 401 does identify a match or correlation between a (new incoming) data message and a data message assigned to a particular destination lobby the lobby assignment mechanism 401 can assign the new incoming data message the same destination lobby. The lobby constructs hold collections of data messages corresponding to communications or sessions between two or more computing devices (e.g., an end user mobile device and a contact center agent computing device or coworker computing device). The plurality of lobby constructs can be identical instances or types of structures, differing only in the collections of data messages they hold and the teams to which they are assigned. For example, there can be exactly one lobby construct assigned per defined team of contact center agent computing devices to attend to defined issues, such as customer complaints or service issues. Similarly, there can be exactly one lobby construct assigned per defined teams (e.g., marketing, sales, customer retention, managerial staff, etc.) within a business structure or a lobby construct may be assigned to a single person or entity. The collections of data messages for this team may be held by a single lobby construct.

Once a data message has been assigned to a lobby construct the callback prioritization engine 202 may identify and aggregate other data related to the data message. For example, if an assigned data message is part of an ongoing session (such as an email thread, text or group messaging conversation) then a data aggregator 402 may retrieve the other messages contained within the session and append or link the other messages to the assigned data message. Additionally, if the assigned data message is a stand alone message (i.e., sent with no connection to a prior session) then the callback prioritization engine 202 may scan for and identify other communications that may be related to the assigned data message. Other communications may be identified as related based upon one or more characteristics of the assigned data message. For example, an end user may receive an email asking for a response of some sort from a coworker which may be related to previous communications exchanged between the end user and the coworker, but not contained within the same thread as the previous communications. In this example, the callback prioritization engine 202 may be able to identify the previous communications as related to the original email asking for a response and append or link them to the assigned data messages generated from the response email. As another example, an end user mobile device 101 may receive a voicemail from an individual or entity (business) asking the end user to callback when available. The voicemail may be transcribed to a text data message and have one or more characteristics, such as the phone number or other identifier associated with the voicemail, and the data aggregator 402 can use the voicemail characteristics to identify an email (or other data message) that may be associated with the voicemail. For example, an employee of a company may send to a second employee a voicemail requesting a callback and further, the two employees may have been emailing or text messaging each other earlier in the day or week. These emails or text messages may be linked to the transcribed voicemail by the data aggregator 402. In this way the data aggregator 402 may identify and aggregate data correlating with a data message assigned to a lobby construct.

The assigned data message and any linked and aggregated data may then be sent as input to a machine learning (ML) engine 403 for processing and analysis. The ML engine 403 may comprise one or more machine learning algorithms such as, for example, a natural language processing (NLP) neural network. The NLP may be used for text classification functions including, but not limited to, sentiment analysis, topic categorization, language recognition, and intent analysis. The NLP may be used to perform sentiment analysis on the assigned data message and any available aggregated data linked to the data message. Sentiment analysis may be used to determine if the content of a data message (and its aggregate data) is positive, negative, or neutral. This could be used to classify data messages to better respond to inquiries or requests. The NLP may be used for topic categorization to determine which category (or lobby construct) a data message belongs to, essentially this constitutes a robust, automatic method of tagging and organizing the content of a data message or its aggregate data. This may be used to automatically separate data messages within a lobby construct by topic. The NLP may be used to understand the intent of a data message or its aggregate data by determining the underlying intention of a given data message. Additionally, the NLP may be used to find and identify relationships between a caller and callee, or a message recipient and a message sender, or between and among a group of people (i.e., multiple people in an email thread or group text message). Using the identified relationships, callback prioritization engine 202 or callback integration engine 201 may generate personalized smart replies based on the identified relationships and other information (intent, sentiment, topic) derived from the NLP. The relationships may be used to determine the priority of an assigned data message within a lobby construct.

In an embodiment, the ML engine 403 may also comprise one or more audio machine learning algorithms which may be used for audio classification and speech recognition functions. Audio classification ML algorithms may be used when a voice messages (voicemail) is received by mobile device 101 or by callback prioritization engine 202. The audio algorithm may be used to identify a speaker by taking a snippet of the voice message to create a unique identifier, like a voice fingerprint. Then the fingerprint may be input into a neural network that can match the unique identifier to a known or previously heard voice. This may allow callback prioritization engine 202 to identify callers who may be calling from a new device or using a new identifier that may not be known by the callback integration engine 201. Furthermore, an audio ML algorithm may be utilized for speech recognition functions such as voice to text technology (i.e., transcribing a voicemail into a text data message) or to provide voice assistant interaction (e.g., in a contact center environment whereby a customer may communicate with a bot or script voice assistant).

There are various benefits of having a ML engine 403 operating locally on a mobile device compared to operating in a cloud environment which the mobile device may connect to. Operating the ML engine 403 on a mobile device 101 protects against low latency. As most ML algorithms may be operating in real-time, network speed may be too slow to transmit a live data feed from the device, to the cloud callback platform 110, and then back to the device. Furthermore, running the ML engine 403 locally on a mobile device 101 removes the risk of low or no network connections halting the ML processes. In a mobile device 101 the ML engine 403 may still work when run on device, even if low or no connectivity. Operating the ML engine 403 locally on a mobile device 101 facilitates privacy over the mobile device user's data. ML needs data to build a useful model and to make useful inferences derived from the model, however, some data may be sensitive (e.g., personal identifying information, regulated data). The callback prioritization engine 202 can use and secure data on the device, without having to transmit any sensitive data.

The ML engine 403 may forward the results of the analyses (e.g., inferences, intent, sentiment, topic, etc.) of the various ML algorithms to a prioritization module 404. The prioritization module 404 may also receive, from the lobby assignment mechanism 401, the assigned lobby construct(s) comprising at least one or more assigned data messages. The prioritization module 404 may then use the results of the analyses (e.g., inferences, intent, sentiment, topic, etc.) to generate a priority score for each data message assigned to a lobby construct. For example, if multiple assigned messages within a construct have been identified to belonging to the same topic, then the most recent data message pertaining to the shared topic may be given a higher priority score and thus the callback associated with that data message would be executed before the previously received data messages. For example, a cable company service agent may be assigned to a lobby construct which has been assigned twenty five data messages, and of those data messages twenty are about a loss of cable service. In this example, the ML engine 403 may be able to identify that each of those twenty data messages originated from the same area code and therefore there must be some service disruption affecting that area code. The prioritization module 404 can use this information to move the first of the twenty people up in priority so that the problem with their cable service may be addressed. If the cable service agent is able to resolve the issue for the first of twenty data messages relating to cable service loss, then the callback prioritization engine 202 may be able to send an automated message to the other of the customers associated with the remaining nineteen data messages providing information about the loss of cable service. For example, an automated message may be sent which says, "Is your call about loss of cable service? If so, we are aware and your service should be restored soon. Would you like to request a callback?". If the receiver of the automated message replies with a callback request, then the data message may remain in the lobby construct, otherwise the data message will be removed from the lobby construct.

Intent and sentiment analysis results may be used to determine priority as well. For example, the sentiment of one data message in a lobby construct may be determined to be positive, whereas the sentiment of another data message in same lobby construct may be urgent, or negative. A data message with an urgent or negative sentiment may be given a higher priority score than a data message with a positive sentiment in order to account for the urgency of the data message, or to quickly respond to the negative sentiment data message in order to change sentiment of the data message sender to neutral or positive. Additionally, the intent of a data message may be used to determine the priority of response. For example, a data message in a lobby construct may indicate that there was no intent for a callback or response, whereas another data message in the lobby construct may have an inferred intent for a callback. In this case, the data message with the inferred intent for a callback will be given a higher priority score than the data message with little to no inferred callback intent.

Based upon the priority score of each data message in a lobby, the prioritization module 404 may reorder the lobby in a hierarchal manner where the highest priority data message is at the top of the lobby and the other data messages are sorted in descending order of priority. The prioritization module 404 may also produce a callback list based upon the sorted lobby. The callback list may include the original data message, any aggregate data, and data contained within the callback object associated with each data message. For example, the callback list may display the original data message, a scheduled callback time, and the name of the callback recipient. The callback list may be sent to the mobile device 101 (or any computing device) for display and interaction by the mobile device user.

Figure 5:
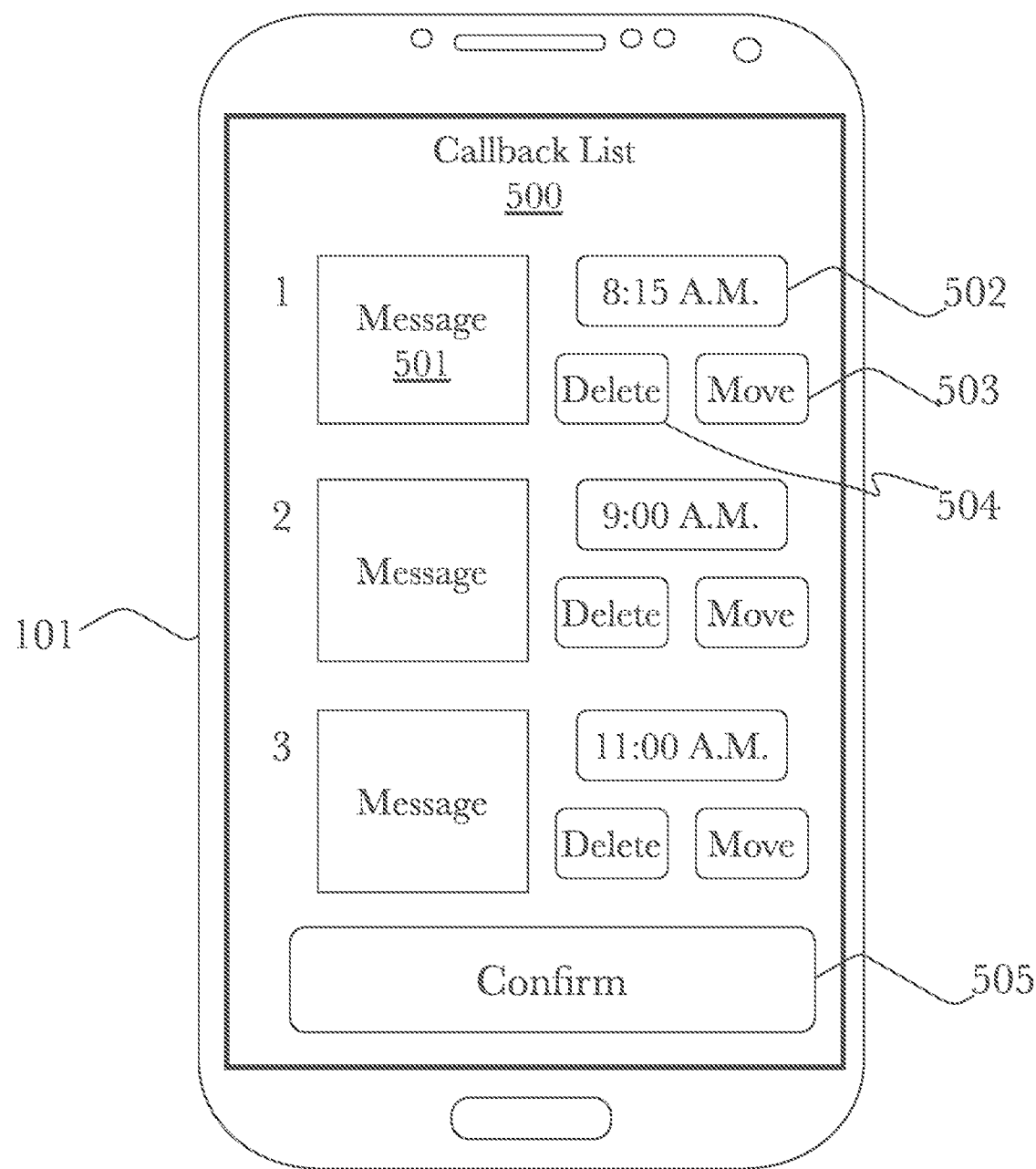
FIG. 5 is a user interface diagram illustrating an exemplary callback list displayed on a mobile device with integrated callback features, according to an embodiment.

FIG. 5 is a user interface diagram illustrating an exemplary callback list 500 displayed on a mobile device 101 with integrated callback and prioritization features, according to an embodiment. According to the embodiment, a mobile device with integrated callback and prioritization features provided by a callback prioritization engine 202 which may generate a callback list from received data messages or voice messages. For example, a mobile device 101 user may be unable to respond to a phone (or voice over internet protocol, "VoIP") call, email, text, or other functionality. A user may be unable to respond for a plurality of reason such as, for example, the user may already be in a call, the user is in a meeting, the user is driving, or the user is otherwise disposed (e.g., working out, doing yard work, etc.). In these instances, the callback integration engine 201 may create a callback object for each received data message or phone call. The callback objects may be sent to a callback prioritization engine 202 where the callback objects may be appended with additional data relating to the received data message or phone call. The data messages or associated callback objects may be assigned to a lobby construct (i.e., callback group). The data messages may then be analyzed via one or more ML algorithms to further provide, determine, generate, or infer context information that may be used to compute priority scores for each data message or callback object in a lobby construct. A callback list 500 may be generated from the lobby constructs, the data messages or callback objects contained with a lobby construct, and the computed priority scores to produce a hierarchal callback list based on priority. In this way, when a mobile device 101 user, who was otherwise unable to respond to the data messages and phone calls, is able to interact with the mobile device 101 (s)he may be able to view an automatically generated callback list with tentative callback times scheduled.

In an embodiment, the callback list may be displayed on a mobile device 101 allowing a mobile device user to view and interact with the callback list 500. The callback list 500 may display one or more data messages 501. For example, the message(s) displayed may be the data message that was received while the user was unavailable and any other aggregate data that may be useful for the device user. In some embodiments, the mobile device 101 may be able to automatically generate smart reply messages that can be sent as a reply to the received data messages or voice messages (voicemails, missed calls) and displayed in the message(s) 501 display. In addition to the displaying the assigned and sorted message 501 the callback list 500 may also display a tentative, scheduled callback time 502 determined by the callback integration engine 201. Also present in this embodiment, are options to delete 504 and move 503 the scheduled callback from the callback list. For example, a mobile device 101 user may decide to send an email in response to the second item on the callback list 500 instead of proceeding with a scheduled callback, in this instance the user may choose to delete 504 the callback from the callback list. Another option the mobile device 101 user may choose is to move 503 the listed callback items. This may be done by selecting a move 503 button on one callback list item and then selecting another move 503 button on a different callback list item facilitating a swap of callback list items in the hierarchy. Another way to move 503 callback list items may be by drag-and-dropping callback items. In this way, one callback item may be moved without having to swap places with another callback item. If an automated smart reply message has be generated and displayed in the callback list, the mobile device 101 user may review and amend the smart reply message within the callback list and then select an option to send the smart reply message. After a smart reply message has been sent, the user may choose to delete or maintain the callback item associated with the smart reply. A mobile device 101 user may choose to confirm 505 the callback list 500 without making any changes, or the user can make alterations (move, delete, swap, etc.) to the callback list 500 and then confirm 505 it. If a confirmation is made without any alterations, the callback integration engine 201 may execute the callback list 500 at the displayed scheduled times 502. If alterations are made to the callback list 500, then the callback integration engine 201 may need to reschedule callback items based upon the alterations implemented by the mobile device 101 user and then execute the scheduled callbacks.

Figure 6:
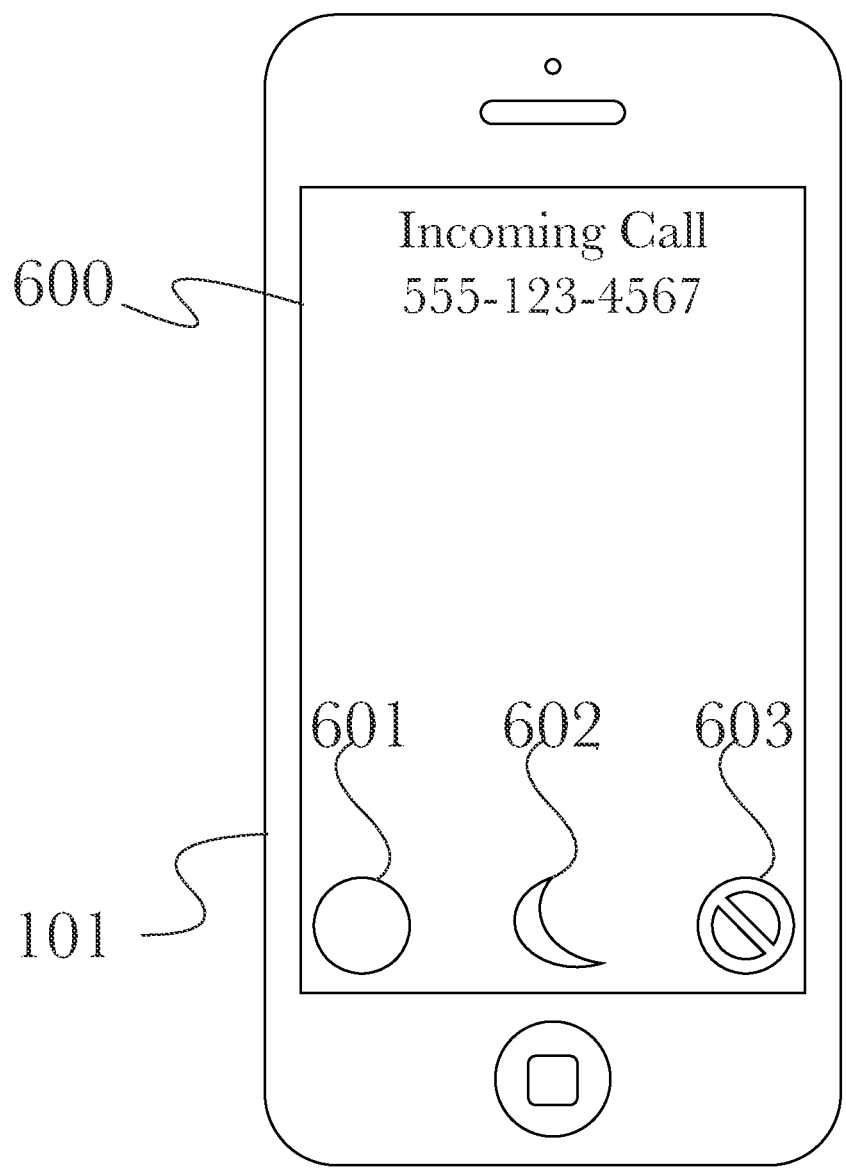
FIG. 6 is a user interface diagram illustrating an exemplary incoming call on a mobile device with integrated callback features, according to an embodiment.

FIG. 6 is a user interface diagram illustrating an exemplary incoming call 600 on a mobile device 101 with integrated callback features, according to an embodiment. According to the embodiment, a mobile device 101 with integrated callback features provided by a callback integration engine 201 may natively incorporate callback functionality into standard functions such as receiving a phone (or voice over Internet protocol, "VoIP") call, email (as described below with reference to FIG. 7), or other functionality. When a call 600 is received, the native answer prompt may present the user with the usual options to answer 601 or decline 603 the call, with normal functionality (generally, either answering the call and starting an interaction, or declining the call and sending it to voicemail or an automated prompt).

Callback integration engine 201 may present an additional prompt to setup a callback 602, either through OS-based software integration with the callback integration engine operating at the OS layer 220, or as a base-level firmware feature that is natively recognized and exposed by the OS while the callback integration engine 201 operates at the firmware level 320. This added option 602 may be used to automatically request or schedule a callback, for example by providing a message to the caller requesting they call back at a predetermined time (for example, based on known availability from a user's on-device calendar), or by engaging with a cloud callback platform 110 to automatically arrange a callback that connects both participants. Whether or not the callback prompt 602 is presented may be configurable, such as by incorporating trust lists or zones that determine what callers may be eligible for a callback (similar to a "favorite contacts" list that may be able to call the user even when a do-not-disturb feature is enabled), or context-based configuration such as to provide a callback prompt when the user is in a meeting or otherwise scheduled as "busy" in their calendar, or when the user is driving.

Figure 7:
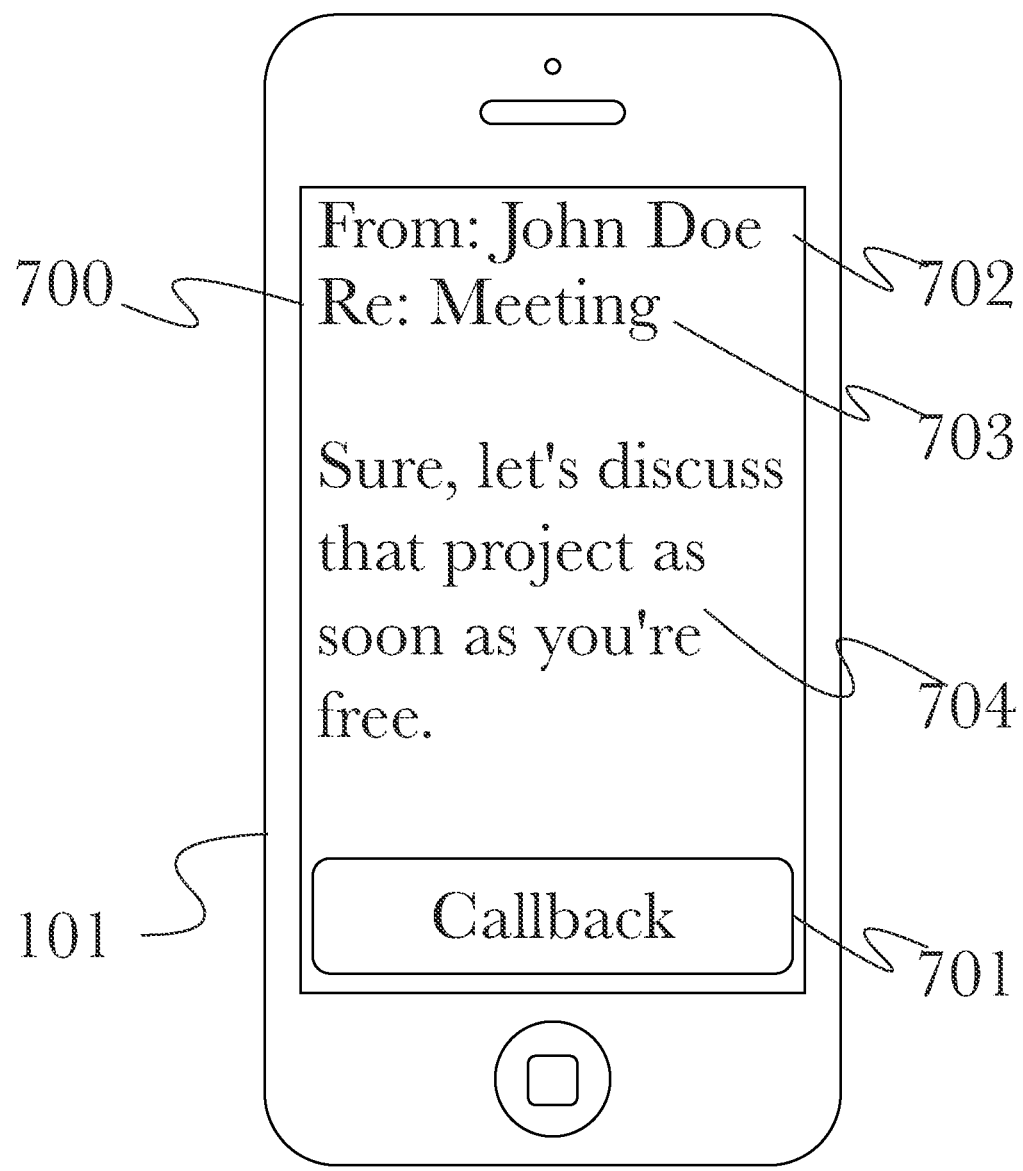
FIG. 7 is a user interface diagram illustrating an exemplary email application operating on a mobile device with integrated callback features, according to an embodiment.

FIG. 7 is a user interface diagram illustrating an exemplary email application 700 operating on a mobile device 101 with integrated callback features, according to an embodiment. According to the embodiment, an email message or contact may be augmented with callback functionality provided by callback integration engine 201, presented as an option 701 to setup an automated callback from within an email application 700. This feature may incorporate information from the current email such as a topic 703, timing 704, or contact information 702, as well as any additional device, context, user, or other information that may be relevant (for example, calendar information or other emails outside the current message or thread), and cause a callback object to be generated. This callback object may then be used to automatically schedule and execute a callback by contacting the participants 702 of the email (and it should be appreciated that this need not be limited to two participants, and may be used to create automated conference calls), and then bridge the individual calls to each participant to complete the interaction by connecting the participants together into a single call.

Callbacks may be scheduled according to a variety of criteria, including (but not limited to) user availability as determined from preconfigured settings or known context (for example, calendar or email information such as invitation responses or verbal commitments in messages that may not have been separately entered into a calendar), user activity based on device information such as network or sensor data (such as if the device is paired to a car audio system, indicating the user is driving, or if there is significant accelerometer data that might indicate the user is in the middle of an exercise activity). Callbacks may then be scheduled to occur when the user is available or no longer indisposed, and may also incorporate availability on the part of the caller by (for example) providing them with a selection of callback options to from which to select a specific callback time. In addition to providing a callback selection on an incoming call prompt, the callback function may be exposed in other areas throughout the device's OS and applications, such as from within voicemail messages (to setup an automated callback with the caller that left the voicemail), social media apps (to setup automated callbacks with other users), or potentially any application operating on the device 101 (such as to setup an automated callback for technical support). This integrated callback operation may be consistent throughout the device's software, providing a native user experience that blends seamlessly with the other features and elements of the device's operating system and applications.

To generate, schedule, and execute callbacks, a callback object is created on the user's device 101 to represent the callback information such as scheduling, context information, user and caller information, and any additional data pertinent to the callback (for example, related interactions such as previous calls or emails exchanged with the caller, or a known call intent based on available information from the user and/or caller, such as email transcripts or voicemail messages). This callback object may be created and maintained on-device, operating locally within the callback integration engine 201 or within an application or feature of the operating system 220 of the user's device 101, enabling full callback functionality regardless of any connection to, or availability of, a cloud callback platform 110. In other arrangements, callback objects may be cloud-based to provide a centralized or software-as-a-service (SaaS) operation mode, for example to provide tiered or subscription-based callback functionalities offered by a callback cloud through handling of callback objects on behalf of users.

Figure 8:
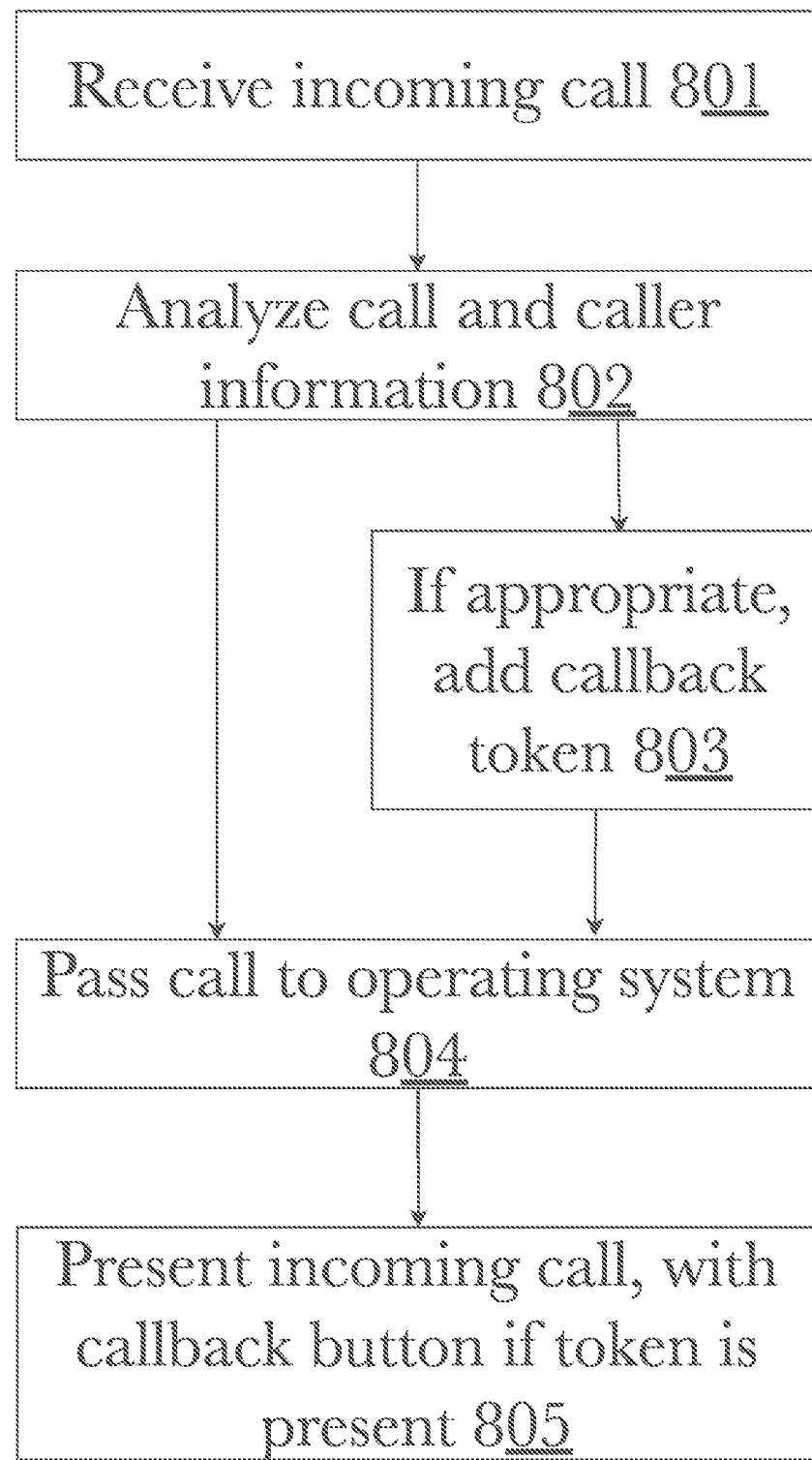
FIG. 8 is a method diagram illustrating an exemplary incoming call flow, according to an embodiment.

FIG. 8 is a method diagram illustrating an exemplary incoming call flow, according to an embodiment. According to the embodiment, a call is received 801 at a mobile device 101. A callback integration engine 201 then analyzes the information available for the call 802, such as (for example, including but not limited to) caller ID, caller and recipient time zones, or whether the caller is a member of a trust zone in the user's settings or contact information (or a trust zone not configured by the user, such as a corporate trust zone for coworkers and colleagues). If the caller is eligible (that is, if they have sufficient trust or if their call is determined to be valuable to the user, such as a call from a technical support number for a company the user recently contacted), a callback token is associated with the call data 803. If the user is untrusted, such as a blocked user or a suspected "spam" number, the call may be passed to the OS layer unmodified 804. When received by the OS layer, the call is then displayed as an incoming notification as usual 805, with a callback token (if available) used to place an additional callback button within the interface using the native OS and call notification user experience (UX) design. This provides an integrated automated callback functionality that is transparently incorporated into device features in a manner consistent with the operating system's UX and familiar to the user, blending the new functionality with the rest of the device features. It should be further appreciated that this mode of operation may function whether the callback integration engine 201 is operating at the firmware 320 or OS 220 level, as many mobile operating systems such as ANDROID™ and IOS™ allow for applications to integrate with communication features such as phone dialers and incoming call notification prompts.

Figure 9:
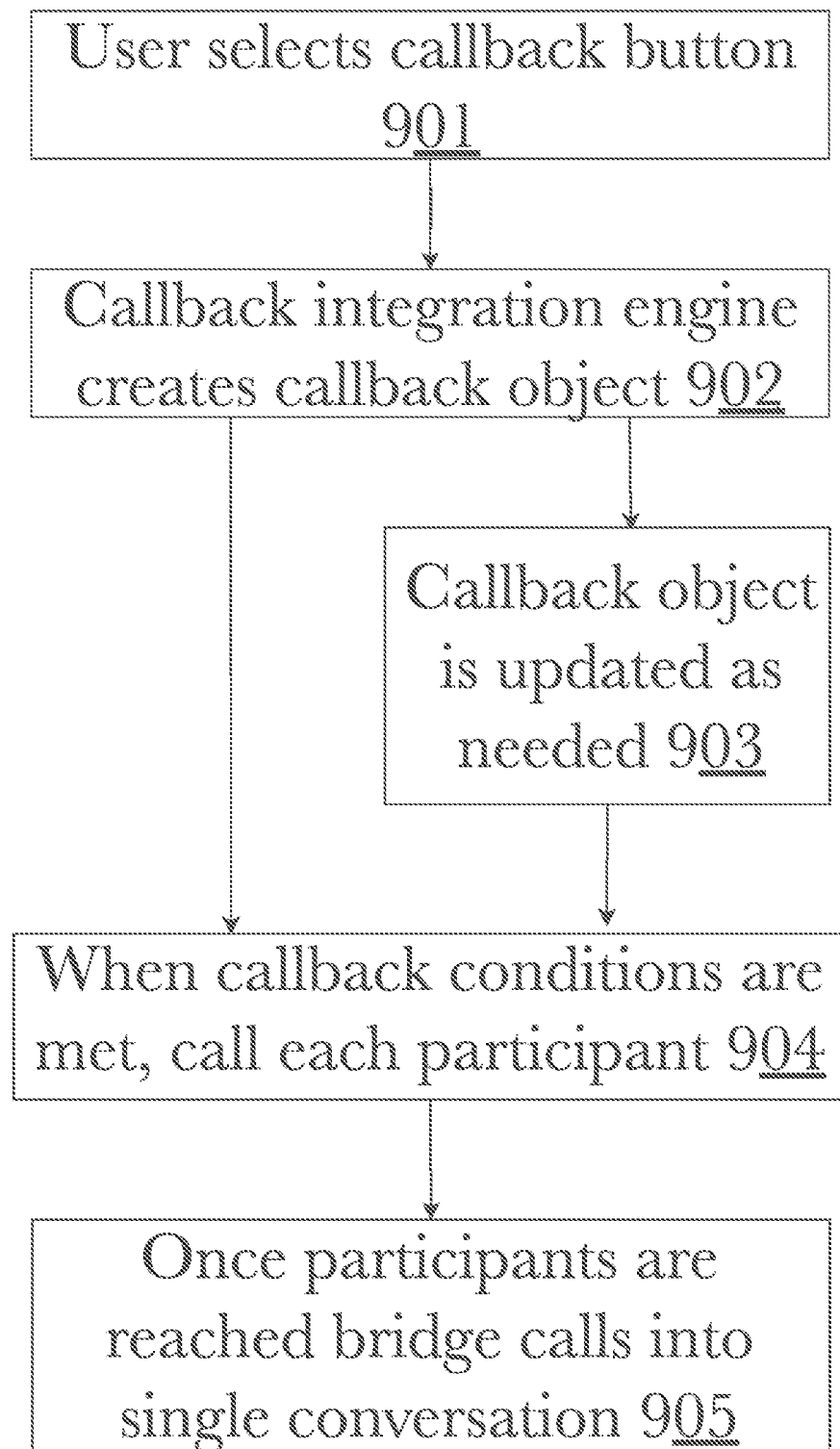
FIG. 9 is a method diagram illustrating an exemplary callback workflow once a user selects a callback for an incoming call, according to an embodiment.

FIG. 9 is a method diagram illustrating an exemplary callback workflow once a user selects a callback for an incoming call, according to an embodiment. Initially, a callback button is selected 901 by the user, either from an incoming call that they wish to defer to an automated callback or from an email for which they wish to automatically setup a callback, or any other interaction, application, or location where an integrated callback button may be present. A callback object is instantiated 902, using a callback integration engine 201, which is an object with data fields representing the various parts of callback data for the user and any other callback participants (for example, the caller if a callback button was pressed on an incoming call notification, or other individuals participating in an email thread if the callback button was pressed from within an email message), and any related information such as what scheduled times may be possible for such a callback to take place. This callback object is then stored and maintained by the callback integration engine 903, updating information when necessary such as to accommodate changes in scheduling or a participant indicating that they will be unavailable during the selected callback time. This may result in modifying the existing callback to reschedule it, and when the conditions for the callback are met (scheduled time arrives, users are available, or any other conditions that may have been set), the callback integration engine 201 initiates a call to each participant 904 and then bridges them into a single call 905 where they may interact. This provides automated connection of multiple individuals as needed, without requiring any participant to initiate the call or remember scheduling information, as the entire process is handled "behind the scenes" by the callback integration engine 201.

Figure 10:
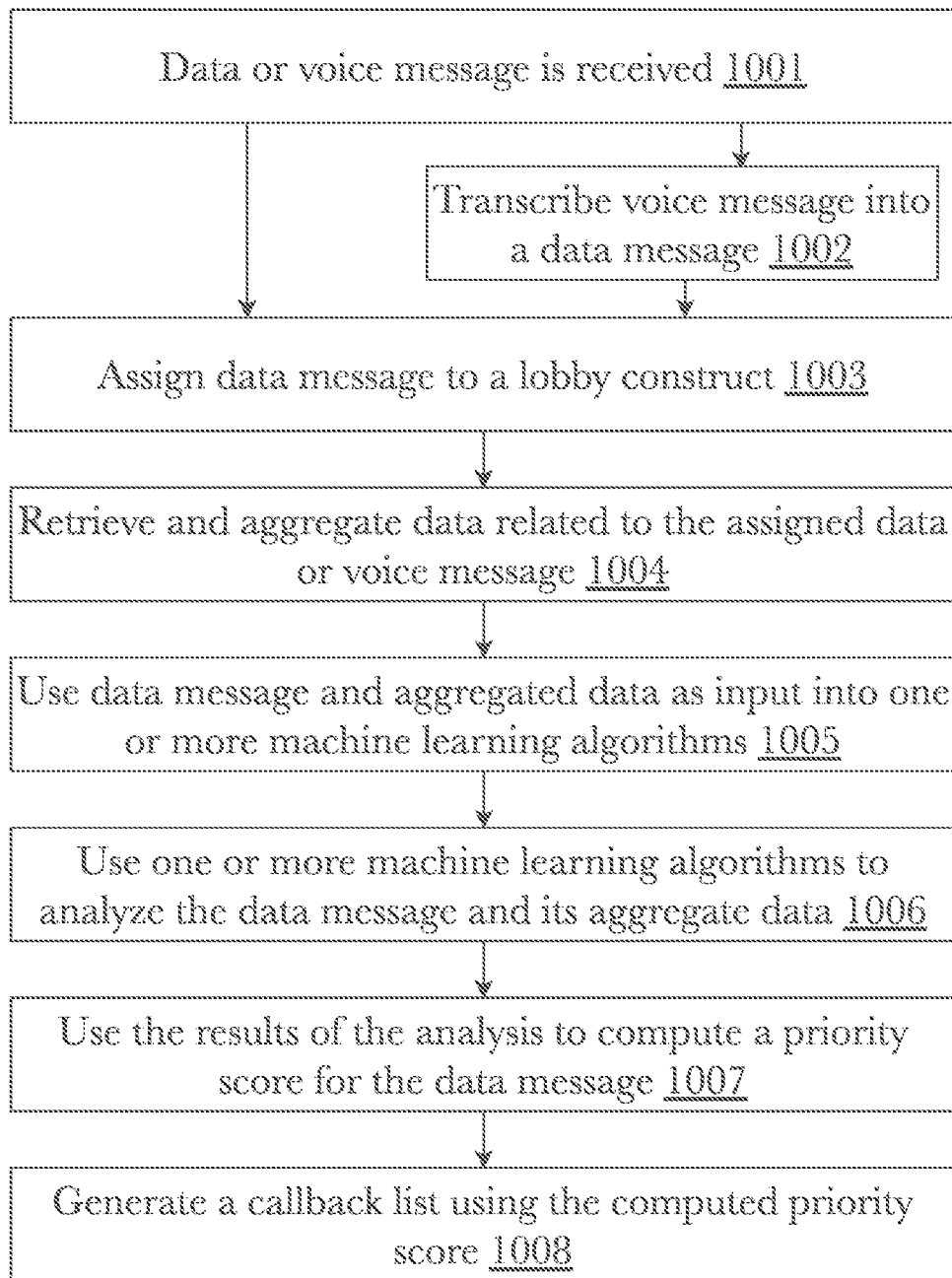
FIG. 10 is a method diagram illustrating an exemplary callback prioritization workflow once a data or voice message is received, according to an embodiment.

FIG. 10 is a method diagram illustrating an exemplary callback prioritization workflow once a data or voice message is received, according to an embodiment. Initially, a data message or voice message (voicemail) may be received 1001 by a computing device 101 wherein the user of the device is unable to respond to the received messages. In some embodiments, the voice message may be transcribed into a data message 1002 for simpler processing by NLP algorithms. The data messages are then assigned to a lobby construct 1003 based upon one or more characteristics associated with the data message. The lobby constructs are groups of data messages that have similar or corresponding characteristics. For each assigned data message in a lobby, the callback prioritization engine 202 may retrieve and aggregate data 1004 related to the assigned data message. Aggregate data may include previous text-based communications which have been identified to be related to the assigned data message. Identifying related information may be conducted using the one or more characteristics of the assigned data message. The assigned data message and any aggregate data may be input into one or more machine learning algorithms 1005, such as, for example, a natural language processing neural network, to analyze the data message and its aggregate data 1006. The analyses of the data message may provide, determine, derive, or infer context data (e.g., intent, sentiment, subject matter, etc.) which can provide more information about the received data messages. The results of the analyses may be used by the callback prioritization engine 202 to compute a priority score for the assigned data messages 1007. Using the computed priority score, a callback list may be generated 1008 which provides a hierarchal schedule of callback items that may be displayed to a user device for review and revision if necessary.

Figure 11:
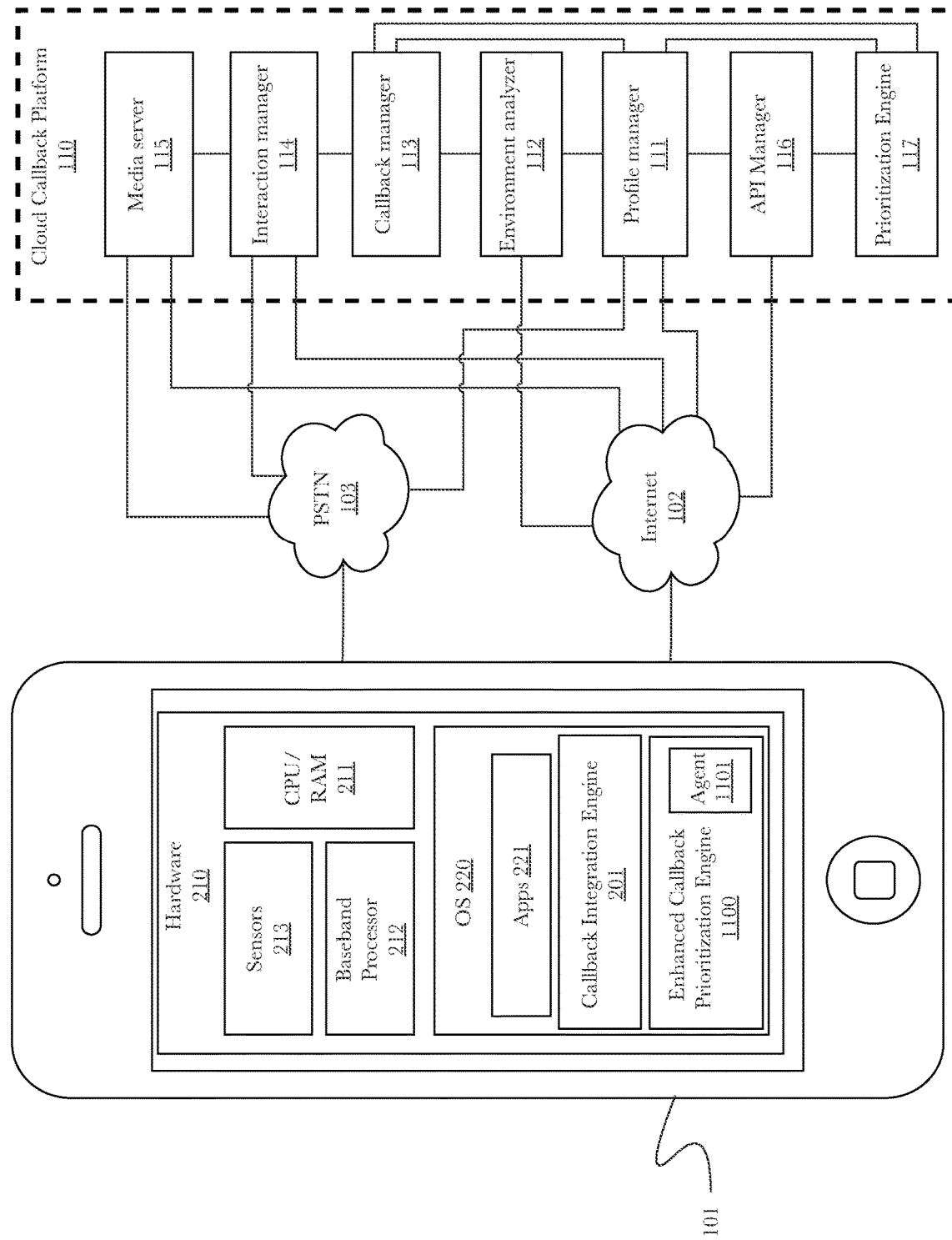
FIG. 11 is a block diagram illustrating an exemplary system architecture for an exemplary mobile device embodiment with an enhanced callback prioritization engine operating at the operating system level and connected to a cloud callback platform, according to an embodiment.

FIG. 11 is a block diagram illustrating an exemplary system architecture for an exemplary mobile device 101 embodiment with an enhanced callback prioritization engine 1100 operating at the operating system level and connected to a cloud callback platform 110, according to an embodiment. According to the embodiment, callback cloud 110 may receive requests via a plurality of communications networks such as a public switched telephone network (PSTN) 103 or the Internet 102. These requests may comprise a variety of communication and interaction types, for example including (but not limited to) voice calls over a telephone line, video calls over a network connection, or live text-based chat such as web chat or short message service (SMS) texting via PSTN 103. Such communications networks may be connected to a plurality of mobile devices 101 such as a user's smartphone or similar mobile device, according to the particular architecture of communication network involved. Mobile devices 101 may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 100 according to the invention.

When needed (for example, when a user manually requests a callback or when configured settings determine that a callback is needed), a user's mobile device 101 creates a session with a cloud callback platform 110 with a profile manager 111, resulting in a callback being required. Profile manager 111 receives initial requests to connect to callback cloud 110, and forwards relevant user profile information to a callback manager 113, which may further request environmental context data from an environment analyzer 112. Environmental context data may include (for example, and not limited to) recorded information about when a user may be suspected to be driving or commuting from work (as may be determined from device information, such as whether a "do not disturb while driving" feature has been enabled, or if the mobile device 101 is currently connected to a car audio system), or if the user may be busy for another reason, such as if they are running or working out (as may be determined from device sensor data), for example, and may be parsed from online profiles or online textual data, using an environment analyzer 112.

A callback manager 113 centrally manages all callback data, creating a callback object which may be used to manage the data for a particular callback, and communicates with an interaction manager 114 which handles requests to make calls and bridge calls, which go out to a media server 115 which actually makes the calls as requested. In this way, the media server 115 may be altered in the manner in which it makes and bridges calls when directed, but the callback manager 113 does not need to adjust itself, due to going through an intermediary component, the interaction manager 114, as an interface between the two. A media server 115, when directed, may place calls and send messages, emails, or connect voice over IP ("VoIP") calls and video calls, to users over a PSTN 103 or the Internet 102. Callback manager 113 may work with a user's profile as managed by a profile manager 111, with environmental context from an environment analyzer 112 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 114 to physically place and bridge the calls with a media server 115.

The cloud callback platform 110 may further include an application programming interface (API) manager 116 and a callback prioritization engine 117, according to an embodiment. The API manager 116 may be used to expose or connect with software related to a callback requester and a callback recipient. For example, API manager 116 may be used to connect with email, messaging, telephone, or other voice communication applications present on a mobile device in order to retrieve text-based data related to emails, text messages such as SMS and from other messaging applications, or voice data such as voicemails. Voice data such as, for example, a voice mail may be transcribed into a text-based data message by the cloud callback platform 110. The retrieved text-based data messages may be sent to a prioritization engine 117 which may identify one or more characteristics of the text-based data messages. The prioritization engine 117 may use the environment analyzer to parse or analyze the retrieved text-based data messages. Analysis of the text-based data messages may be used to determine or infer a variety of metrics pertaining to a callback requester and at least one callback recipient, such as (but not limited to) relationships, intent, subject matter, and sentiment. Based on the analysis of the text-based data messages, the callback prioritization engine 117 may produce priority score for each text-based data message which can be used to order lobbies (callback groups) in order of priority.

According to the embodiment, a mobile device 101 comprises several hardware and software components operating at various levels to provide various functions. At the most basic hardware level 210, the physical hardware of the mobile device 101 may comprise a processor and memory 211 that provide standard computing device functionality as described in detail below, with reference to FIGS. 14-17 (grouped together here for the sake of clarity, it should be appreciated that processor/memory may or may not be part of the same hardware component, such as a system-on-a-chip), a baseband processor 212 that manages radio-based communication functions such as cellular or Wi-Fi connectivity, as well as any of a number of hardware sensors 213 such as (for example, including but not limited to) an accelerometer to detect or measure device movement, gyroscope for detecting or measuring device orientation, barometer for measuring ambient environment conditions, or global positioning system (GPS) receiver for geolocating the device.

An operating system (OS) 220 comprises the main software operating on mobile device 101 and providing various software-based functions such as software applications and communications. Various software applications 221 operating within (for example in an application layer not shown here but as is commonly used in various computing devices according to the standard OSI process model of computing systems) on the mobile device 101 may expose and provide access to, or interaction with, various hardware and sensor features such as to enable a user to view or calibrate sensor readings.

According to the embodiment, a callback integration engine 201 may comprise local (that is, operating on the mobile device) functionality similar to a cloud-based callback manager 113 described above, and may operate as an application or feature at the operating system level 220, running at a similar privilege level and having similar access to hardware and software functions as other applications 221 operating on mobile device 101. This enables easy installation or removal of callback integration engine 201, as it may be readily distributed via similar methods as any other software application (for example, via an application store or similar download portal). However, this may restrict the capabilities of callback integration engine 201, as it will have only indirect access to hardware features (as it will only be able to access whatever features are exposed by the operating system) and in many cases may be "sandboxed" and prevented from directly accessing other software or information on the mobile device 201 (for example, in a sandboxed software environment such as APPLE IOS™ or similar).

According to the embodiment, an enhanced callback prioritization engine 1100 may comprise local (that is, operating on the mobile device) functionality similar to a cloud-based prioritization engine 117 described above, and may operate as an application or feature at the operating system level 220, running at a similar privilege level and having similar access to hardware and software functions as other applications 221 operating on mobile device 101. The enhanced callback prioritization engine 1100 may be included within the same application as the callback integration engine 201 or it may be packaged as its own application with built in functionality to communicate with and share data with a separate callback integration engine 201. This enables easy installation or removal of an enhanced callback prioritization engine 1100, as it may be readily distributed via similar methods as any other software application (for example, via an application store or similar download portal).

The callback integration engine 201 may intercept (e.g., receive, hook, access, or otherwise obtain) voice messages (i.e., voicemail) and text-based data messages such as (but not limited to) short message service (SMS), emails, and group chats sent to the mobile device 101 and route them to an enhanced callback prioritization engine 1100 as a callback object associated with the intercepted data or voice messages. In an embodiment, the mobile device 101 may transcribe voice messages into text-based data message for further processing. Each text-based data message and voice message (or its transcription) may have one or more characteristics, such as indications of source, destination, data message subject matter, end user identifiers or account identifiers. Application 221 data associated with the data message is aggregated and linked to the callback object. For example, a first email sent to a mobile device 101 may be intercepted and then the enhanced callback prioritization engine 1100 can identify and retrieve other emails, text messages, group chats, financial transactions, social media interactions from application 221 on the phone 101 and associated with the first email in order to provide more context for the first email message. In this example, other communications exchanged between the first email recipient and the first email sender (such as an email thread, text messages, or voicemails) may be aggregated and added to the callback object associated with the first email. The aggregated data may then be fed into one or more machine learning algorithms that analyze the aggregated data and can generate for each data message a priority score. The priority score may be used to create a hierarchy or priority list of callback objects such that each callback may be scheduled and executed in order of highest priority to lowest priority.

According to another embodiment, an exemplary mobile device 101 with a callback integration engine 201 and an enhanced callback prioritization engine 1100 can operate at the device firmware level, according to an embodiment. According to the embodiment, a firmware level encompasses low-level program code that operates "below" the operating system 220, operating directly on hardware components of mobile 101, and comprises such features as a baseband controller that controls features of baseband processor 212 and the operation of which is fully transparent to the user (that is, a user of mobile device 101 does not see or interact with firmware, and many users may not even be aware of its existence or capabilities).

According to the embodiment, a callback integration engine 201 and an enhanced callback prioritization engine 1100 may operate as a firmware component that directly interfaces with hardware features of mobile device 101, enabling direct control as needed while exposing desired functionality to the operating system 220 in a transparent manner (that is, the operating system may only know that a feature is available, and may not be able to determine that the feature is provided by the callback integration engine 201 or callback prioritization engine 202 rather than, for example, the baseband controller). This enables more direct control over device functions, such as call and data message routing and hardware information such as sensor readings (as may be used in callback workflow processing), and allows the callback integration engine 201 to intercept incoming calls and radio information (e.g., data messages) before it reaches the operating system, so data may be manipulated and additional features may be integrated prior to presentation to the OS. This also prevents accidental removal of callback integration engine 201 and an enhanced callback prioritization engine 1100, as a user may have no control over device firmware and anything operating at or below the OS level 220 would inherently have insufficient access to modify firmware. This further enables callback integration engine 201 and an enhanced callback prioritization engine 1100 to access hardware features that may be restricted or completely prevented when operating within the OS layer 220, for example hardware sensor or geolocation information that may be incorporated into a callback workflow.

According to another embodiment, wherein the enhanced callback prioritization engine 1100 runs at the operating system 220 level, an agent 1101 may be included with the enhanced callback prioritization engine 1100 that is provided with root access and privileges in order to monitor the mobile device and access all files and folders needed to achieve to retrieval of third-party app data for use in the machine learning analysis.

Figure 12:
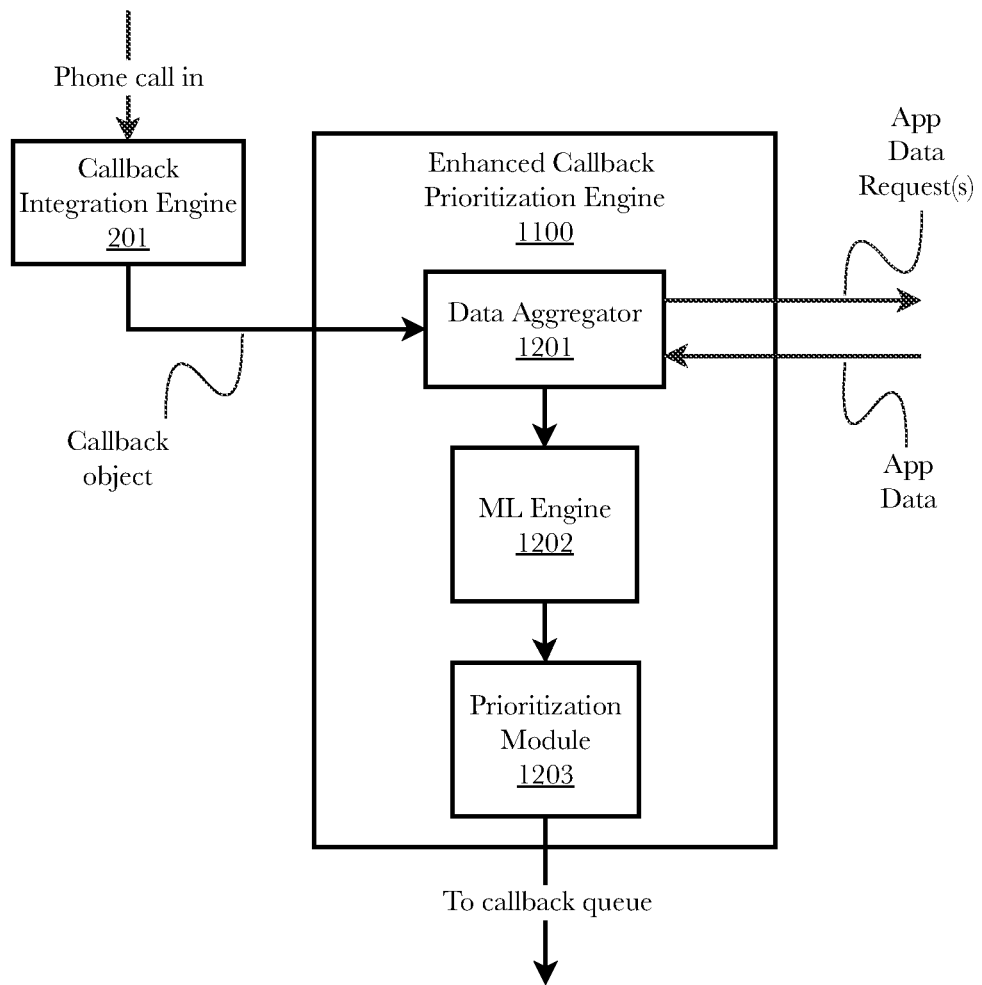
FIG. 12 is a block diagram illustrating an exemplary system architecture for an enhanced callback prioritization engine, according to an embodiment.

FIG. 12 is a block diagram illustrating an exemplary system architecture for an enhanced callback prioritization engine 1100, according to an embodiment. According to the embodiment, an enhanced callback prioritization engine 1100 may receive a callback object with a data message comprising a characteristic from a callback integration engine 201. The data message can have part of sessions that include asynchronous text, voice message, or data message (e.g., not a live voice conversation such as a telephone call) communications between and end user and a computing device (e.g., mobile device, contact center agent [e.g., a person, bot, or combination thereof], etc.). In some examples, an enhanced callback prioritization engine 1100 can receive voice messages that have been send as audio messages (voicemail) or converted into text messages. The sessions can occur continuously in a conversational manner, or can be intermittent, e.g., lasting over hours, days, or weeks with dormant periods between communications. The enhanced callback prioritization engine 1100 receiving data messages with characteristics can then find other relevant application data using the information in the callback object.

The enhanced callback prioritization engine 1100 may identify and aggregate other data related to the data message. For example, if an assigned data message is part of an ongoing session (such as an email thread, text, or group messaging conversation) then a data aggregator 402 may retrieve the other messages contained within the session and append or link the other messages to the assigned data message. Additionally, if the assigned data message is a standalone message (i.e., sent with no connection to a prior session) then the enhanced callback prioritization engine 1100 may scan for and identify other communications that may be related to the assigned data message. Other communications may be identified as related based upon one or more characteristics of the assigned data message. For example, an end user may receive an email asking for a response of some sort from a coworker which may be related to previous communications exchanged between the end user and the coworker, but not contained within the same thread as the previous communications. In this example, the enhanced callback prioritization engine 1100 may be able to identify the previous communications as related to the original email asking for a response and append or link them to the assigned data messages generated from the response email. As another example, an end user mobile device 101 may receive a voicemail from an individual or entity (business) asking the end user to callback when available. The voicemail may be transcribed to a text data message and have one or more characteristics, such as the phone number or other identifier associated with the voicemail, and the data aggregator 1201 can use the voicemail characteristics to identify an email (or other data message) that may be associated with the voicemail. For example, an employee of a company may send to a second employee a voicemail requesting a callback and further, the two employees may have been emailing or text messaging each other earlier in the day or week. These emails or text messages may be linked to the transcribed voicemail by the data aggregator 1201. In this way the data aggregator 1201 may identify and aggregate application data correlating with a data message.

Social media apps may also be associated with a callback object. For example, two competing callback requests, both scoring the same in a callback queue—may be resolved by determining recent social media interactions. If social media interaction is higher between one of the callback requesters and the user, then that callback request can be placed in a higher priority than the other. Social media history may comprise likes, mentions, thumbs-up/down, or other means the service uses to indicate sentiment. If the caller is a moderator or administrator on a forum or other outlet where the user is a member or has recent activity, then higher priority can be given over regular or non-members.

Financial apps may also be used to determine if a callback requester is associated with an invoice, pay request, or other financial transaction. Financial app integration may inform the machine learning algorithms 1202 to prioritize callbacks based on transactions amounts, e.g., a first callback requester who sent the user a large monetary sum is given priority over a second callback requester that has sent a small amount of funds.

The assigned data message and any linked and aggregated data may then be sent as input to a machine learning (ML) engine 1202 for processing and analysis. The ML engine 1202 may comprise one or more machine learning algorithms such as, for example, a natural language processing (NLP) neural network. The NLP may be used for text classification functions including, but not limited to, sentiment analysis, topic categorization, language recognition, and intent analysis. The NLP may be used to perform sentiment analysis on the assigned data message and any available aggregated data linked to the data message. Sentiment analysis may be used to determine if the content of a data message (and its aggregate data) is positive, negative, or neutral. This could be used to classify data messages to better respond to inquiries or requests. The NLP may be used to determine urgency. Identifying keywords and sentiments that provide insight and context into the callback request. The NLP may be used for topic categorization to determine which category a data message belongs to, essentially this constitutes a robust, automatic method of tagging and organizing the content of a data message or its aggregate data. The NLP may be used to understand the intent of a data message or its aggregate data by determining the underlying intention of a given data message. In addition, the NLP may be used to find and identify relationships between a caller and callee, or a message recipient and a message sender, or between and among a group of people (i.e., multiple people in an email thread or group text message). Using the identified relationships, an enhanced callback prioritization engine 1100 or callback integration engine 201 may generate personalized smart replies based on the identified relationships and other information (intent, sentiment, urgency, topic) derived from the NLP. The relationships may be used to determine the priority of an assigned data message. Additionally, NLP can also be used to determine urgency of a callback. Given certain keywords such as "it's important", "right away", and "urgent" can be used to give some callback requests higher priority than others.

In an embodiment, the ML engine 1202 may also comprise one or more audio machine learning algorithms which may be used for audio classification and speech recognition functions. Audio classification ML algorithms may be used when a voice message (voicemail) is received by mobile device 101 or by an enhanced callback prioritization engine 1100. The audio algorithm may be used to identify a speaker by taking a snippet of the voice message to create a unique identifier, like a voice fingerprint. Then the fingerprint may be input into a neural network that can match the unique identifier to a known or previously heard voice. This may allow an enhanced callback prioritization engine 1100 to identify callers who may be calling from a new device or using a new identifier that may not be known by the callback integration engine 201. Furthermore, an audio ML algorithm may be utilized for speech recognition functions such as voice to text technology (i.e., transcribing a voicemail into a text data message) or to provide voice assistant interaction (e.g., in a contact center environment whereby a customer may communicate with a bot or script voice assistant).

There are various benefits of having a ML engine 1202 operating locally on a mobile device compared to operating in a cloud environment which the mobile device may connect to. Operating the ML engine 1202 on a mobile device 101 protects against low latency. As most ML algorithms may be operating in real-time, network speed may be too slow to transmit a live data feed from the device to the cloud callback platform 110, and then back to the device. Furthermore, running the ML engine 1202 locally on a mobile device 101 removes the risk of low or no network connections halting the ML processes. In a mobile device 101 the ML engine 1202 may still work when run on device, even if low or no connectivity. Operating the ML engine 1202 locally on a mobile device 101 facilitates privacy over the mobile device user's data. ML needs data to build a useful model and to make useful inferences derived from the model, however, some data may be sensitive (e.g., personal identifying information, regulated data). The enhanced callback prioritization engine 1100 can use and secure data on the device, without having to transmit any sensitive data.

The ML engine 1202 may forward the results of the analyses (e.g., inferences, intent, sentiment, urgency, topic, etc.) of the various ML algorithms to a prioritization module 1203. The prioritization module 1202 may then use the results of the analyses (e.g., inferences, intent, sentiment, urgency, topic, etc.) to generate a priority score for each data message. For example, if multiple assigned messages within a construct have been identified to belonging to the same topic, then the most recent data message pertaining to the shared topic may be given a higher priority score and thus the callback associated with that data message would be executed before the previously received data messages. For example, a cable company service agent may have twenty five data messages, and of those data messages twenty are about a loss of cable service. In this example, the ML engine 1202 may be able to identify that each of those twenty data messages originated from the same area code and therefore there must be some service disruption affecting that area code. The prioritization module 1203 can use this information to move the first of the twenty people up in priority so that the problem with their cable service may be addressed. If the cable service agent is able to resolve the issue for the first of twenty data messages relating to cable service loss, then the enhanced callback prioritization engine 1100 may be able to send an automated message to the other of the customers associated with the remaining nineteen data messages providing information about the loss of cable service. For example, an automated message may be sent which says, "Is your call about loss of cable service? If so, we are aware, and your service should be restored soon. Would you like to request a callback?". If the receiver of the automated message replies with a callback request, then the data message may remain in the queue, otherwise the data message will be removed from the callback queue.

Intent and sentiment analysis results may be used to determine priority as well. For example, the sentiment of one data message may be determined to be positive, whereas the sentiment of another data message may be urgent, or negative. A data message with an urgent or negative sentiment may be given a higher priority score than a data message with a positive sentiment in order to account for the urgency of the data message, or to quickly respond to the negative sentiment data message in order to change sentiment of the data message sender to neutral or positive. Additionally, the intent of a data message may be used to determine the priority of response. For example, a data message may indicate that there was no intent for a callback or response, whereas another data message may have an inferred intent for a callback. In this case, the data message with the inferred intent for a callback will be given a higher priority score than the data message with little to no inferred callback intent.

Based upon the priority score of each data message, the prioritization module 404 may reorder the callback queue in a hierarchal manner where the highest priority data message is at the top of the queue and the other data messages are sorted in descending order of priority. The prioritization module 1203 may also produce a callback list based upon the sorted queue. The callback list may include the original data message, any aggregate data, and data contained within the callback object associated with each data message. For example, the callback list may display the original data message, a scheduled callback time, and the name of the callback recipient. The callback list may be sent to the mobile device 101 (or any computing device) for display and interaction by the mobile device user.

An additional anticipated feature of the instant invention is incentivized on-device callback management. This is where rewards are offered to the mobile device user for handling a callback in a specified manner. This could be a specific time—e.g., "call back within this window for a bonus!", or "if you call back, use code ABC for a discount; only valid for twenty-four hours" Specific channels could be incentivized such as asking a user to reach out on a specific platform. Rewards could be in the form of in-game rewards, money, discounts, add-ons to their mobile service plan, priority handling on their next initiated interaction, or discounted or free service provided by the caller—e.g., "get in touch with us via our streaming channel for a free month!".

Incentivized on-device callback management may be implemented by using NLP to determine the incentives from the data message and adding a function to each callback object meeting the criteria of the data message's incentive. For example, if a user is given an incentive to call back within 24 hours to receive 20% off of becoming a new member of a service, a message or notification may be generated on the users device alerting them of the offer and providing a link to the specific callback object on the callback list.

Figure 13:
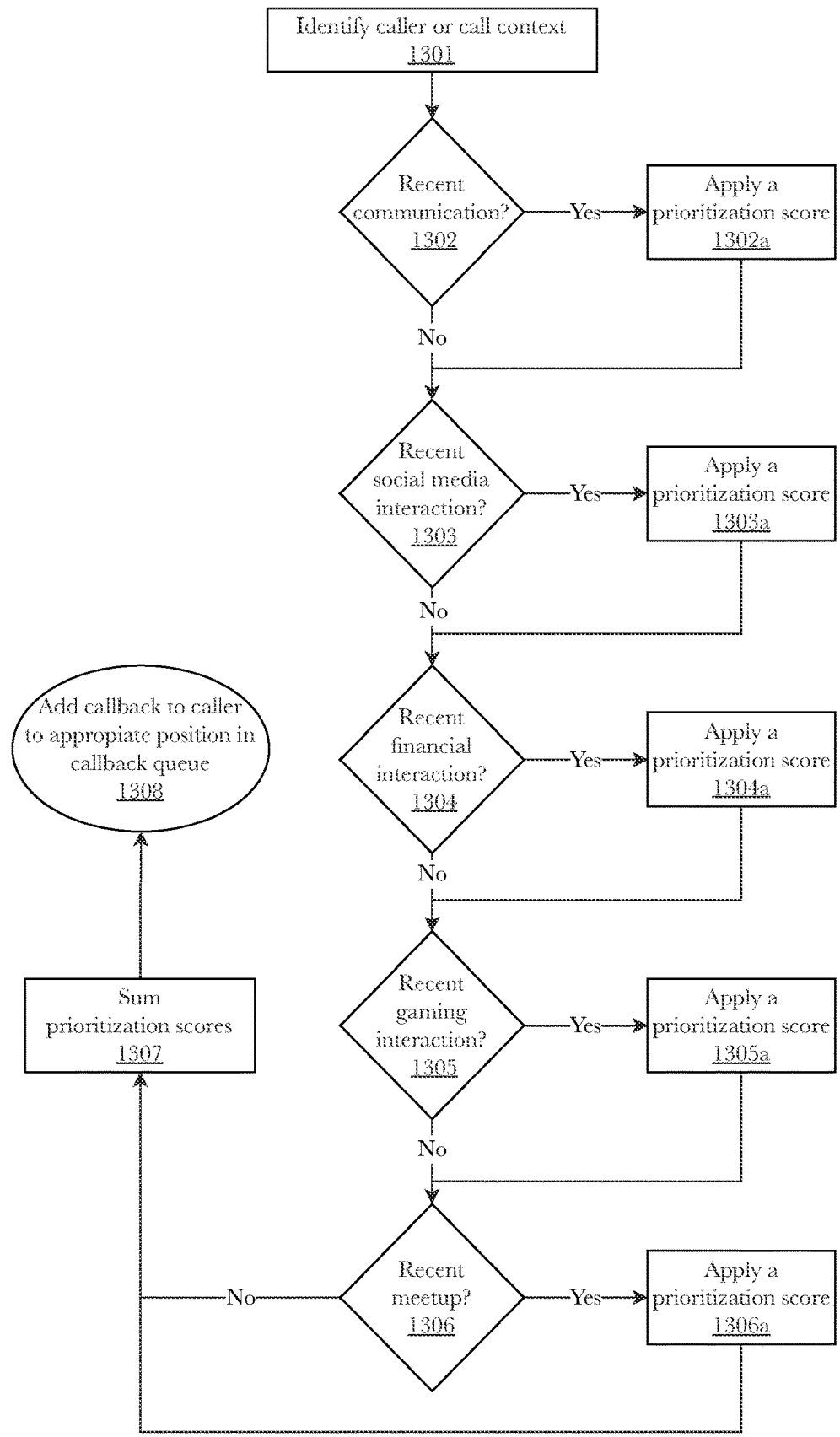
FIG. 13 is a method diagram illustrating several app integrations for enhancing callback prioritization.

FIG. 13 is a method diagram illustrating several app integrations for enhancing callback prioritization. This diagram illustrates features of the data aggregator 1201 using APIs and other functions (e.g., screen monitoring, administrative access, etc.) to retrieve information from the mobile device in order to provide context to callback request scoring and ordering. When a characteristic is known about the callback request 1301—e.g., caller name, location, business, demographics, subject matter, etc., the data aggregator 1201 retrieves, from the applications in the mobile device, any communications 1302 from the same caller, business, subject matter, etc. If enough data points from the machine learning 1202 suggest a communication or interaction from an external application is relevant, that communication or interaction may be used with the original callback request analysis to provide some context with regards to sentiment, urgency, relationships, and intent. The higher the machine learning confidence is for the sentiment, urgency, relationships, and intent of the external application data in relation to the callback request, the higher the value of a prioritization score will be 1302. This same analysis and scoring continue for social media interactions 1303/1303a, financial interactions 1304/1304a, and gaming interactions 1305/1305a. Sensors and sensor history may be used, apart from or alongside of calendar or to-do apps to determine if the caller and the user have been in the same area or met physically recently 1306/1306a. For example, after a recent trip to a specific business in China, an American business executive may receive a follow-up call from the business clerk. The callback will reach a high priority based on the travel data and nature of the user's business.

Example sentiments, relationships, and intents comprise, but are not limited to scheduled events involving the caller and recent events involving caller determined by GPS history or shared events or calendars. Whether a caller is a team member, party member, or a competitor. Whether the caller a developer, moderator, player, or otherwise involved in a game the user plays. Recent interactions on social media may be analyzed such as likes, mentions, thumbs-up/down, or some means the service uses to indicate sentiment. The caller may a moderator or administrator on a forum or other outlet where the user is a member or has recent activity. It could be determined if a caller owes the user money, the user owes the caller money, or the caller and user have exchanged money recently.

Each prioritization score 1302a, 1303a, 1304a, 1305a, 1306a is then summed 1307 and used to place the callback object in the appropriate place in the callback list 1308. Prioritization scores 1302a, 1303a, 1304a, 1305a, 1306a may fall on any scale or range desired and may be normalized as seen fit, evident to those with ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 14:
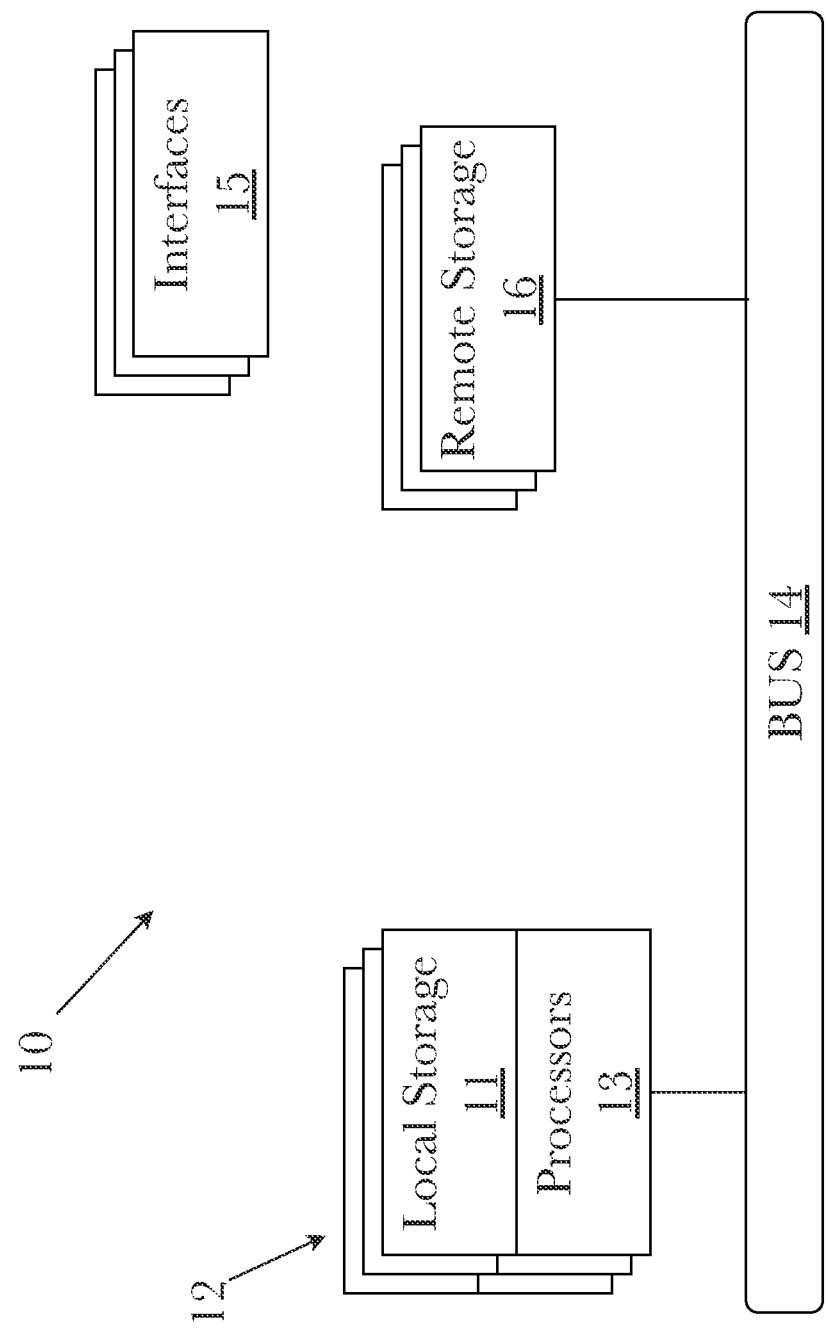
FIG. 14 is a block diagram illustrating an exemplary hardware architecture of a computing device.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 14 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
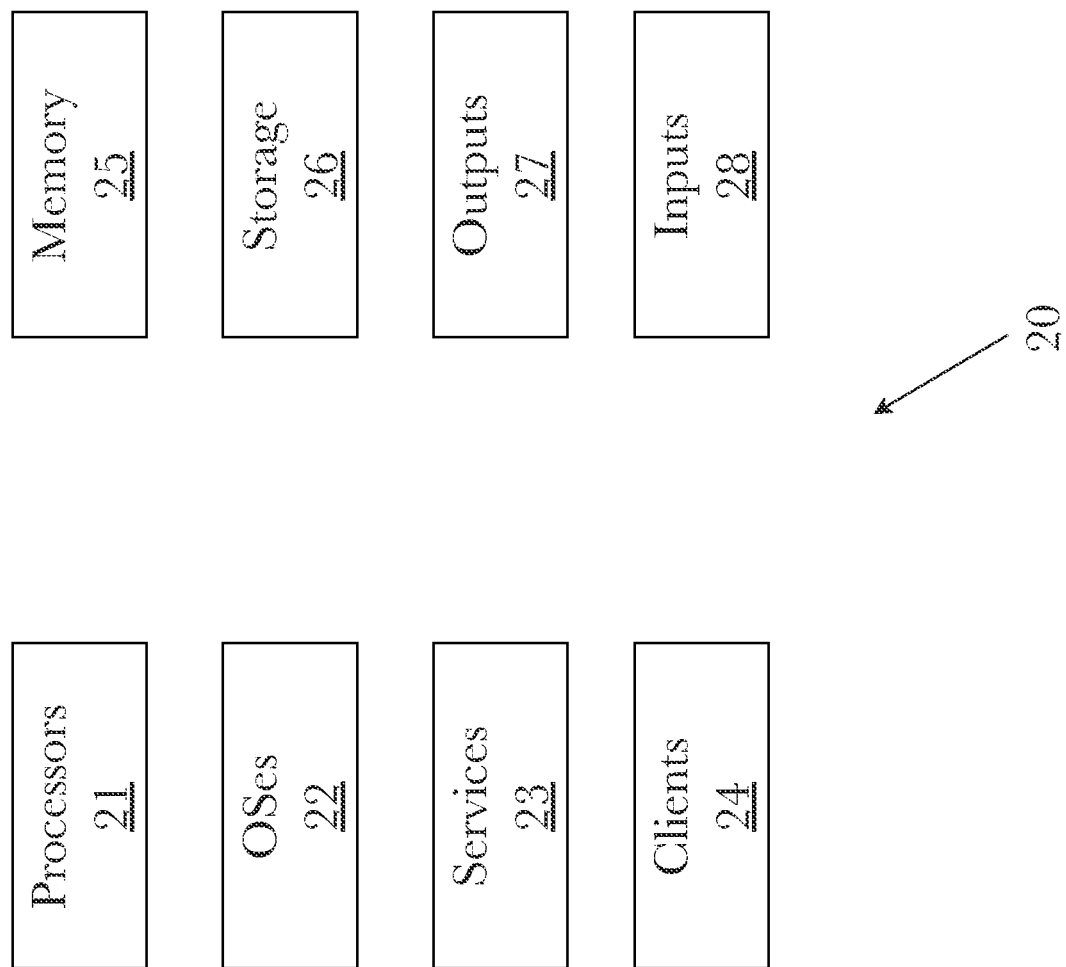
FIG. 15 is a block diagram illustrating an exemplary logical architecture for a client device.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 14). Examples of storage devices 26 include flash memory, magnetic hard drive, CD-ROM, and/or the like.

Figure 16:
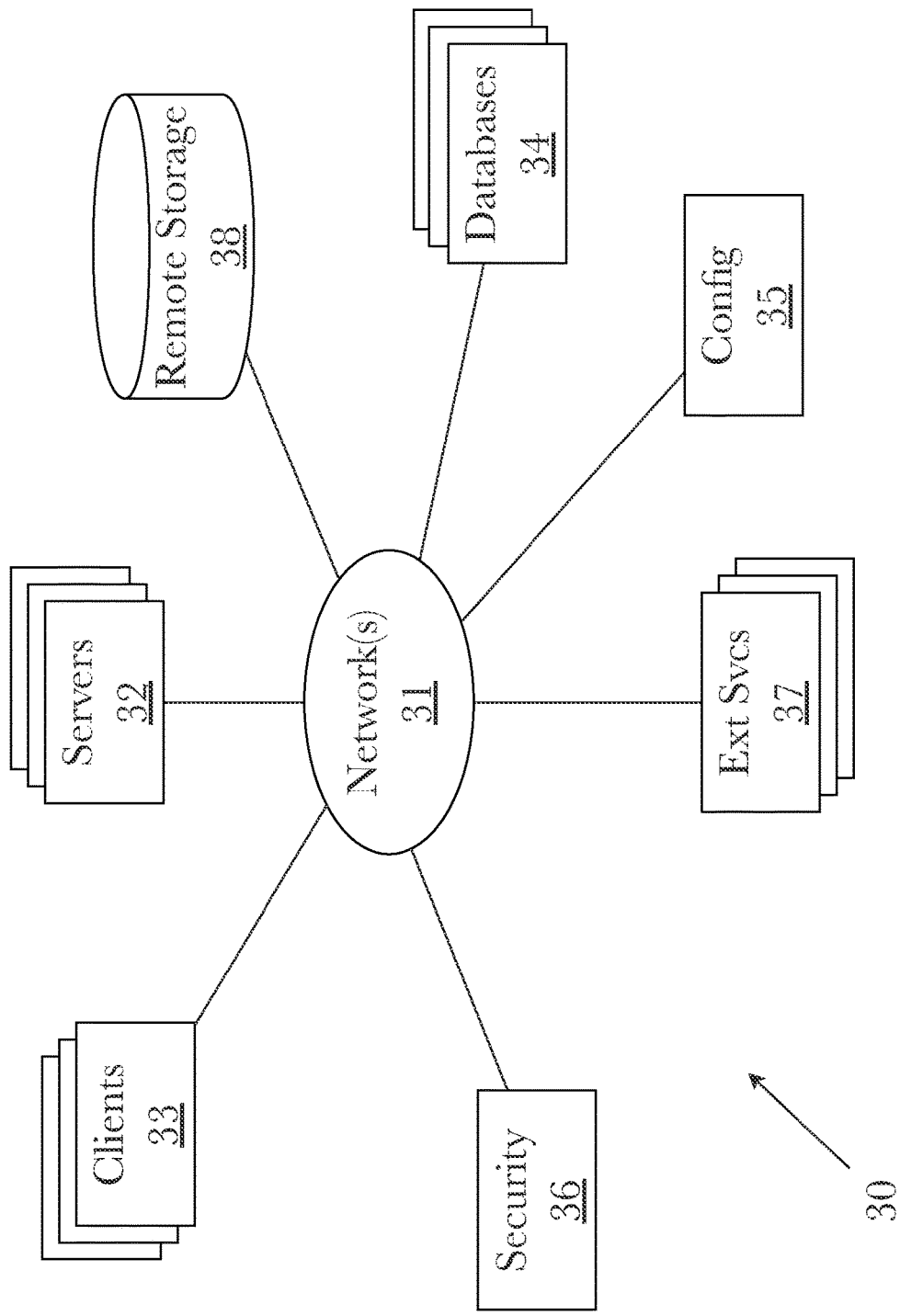
FIG. 16 is a block diagram showing an exemplary architectural arrangement of clients, servers, and external services.

In some embodiments, systems of the present invention may be implemented on a distributed computing network, such as one having any number of clients and/or servers. Referring now to FIG. 16, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 15. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 17:
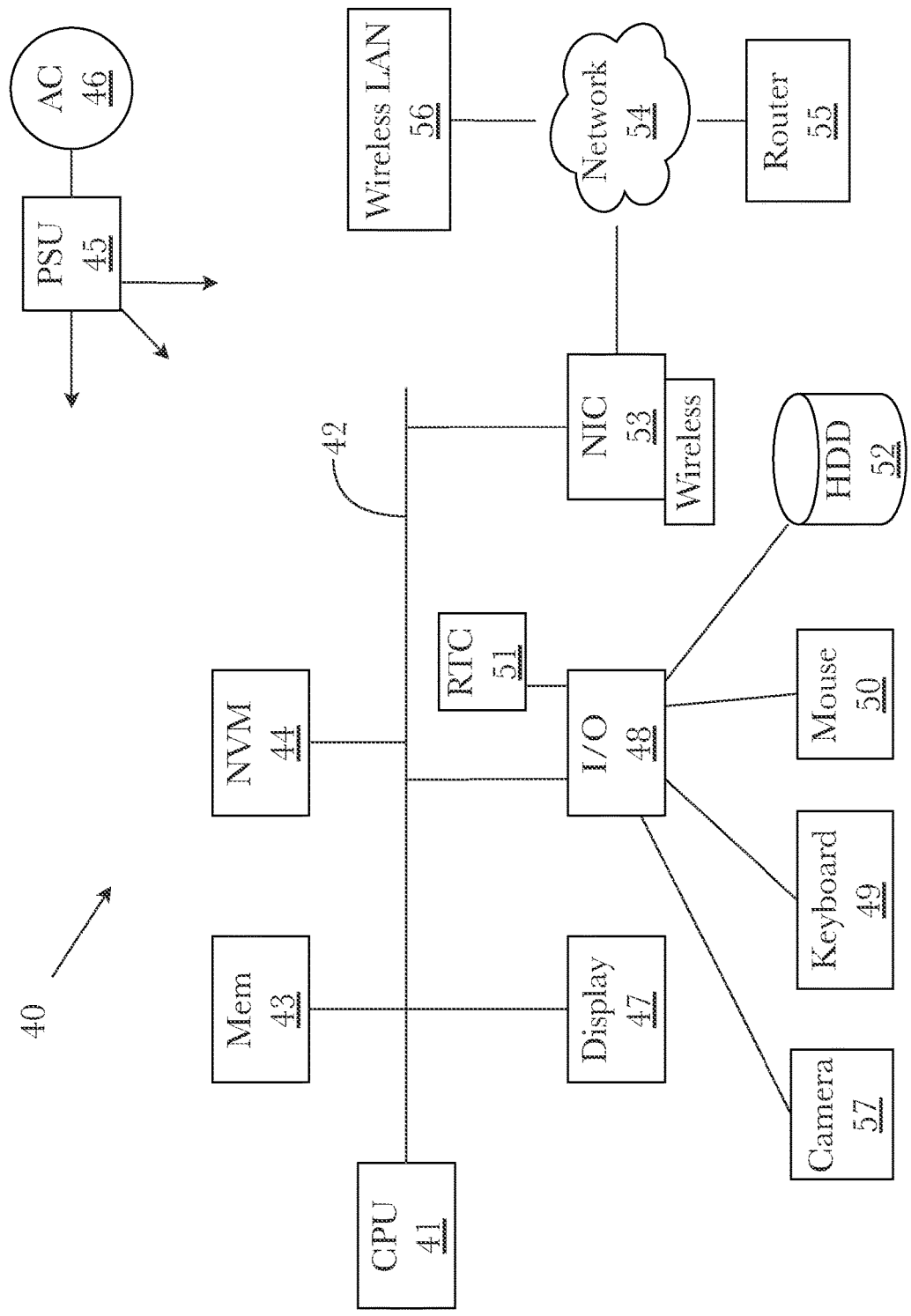
FIG. 17 is another block diagram illustrating an exemplary hardware architecture of a computing device.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A mobile device with active callback prioritization, comprising:
a processor, a memory, and a plurality of programming instructions stored in the memory and operable on the processor;
a callback integration engine comprising a subset of the plurality of programming instructions that, when operating on the processor, cause the processor to:
receive a data or voice message, the data or voice message comprising at least one characteristic;
produce a callback object in memory comprising information associated with the data or voice message received; and
send the callback object to an enhanced callback prioritization engine; and
the enhanced callback prioritization engine comprising a subset of the plurality of programming instructions that, when operating on the processor, cause the processor to:
receive the callback object from the callback integration engine;
retrieve and aggregate application data related to the data or voice message;
use the callback object and the aggregated application data as inputs into one or more machine learning algorithms, wherein the machine learning algorithms analyze the callback object's information and the aggregated application data to determine the context and urgency associated with the data or voice message;
for each callback object, compute a priority score based at least upon the results of the analysis; and
use the computed priority score, the callback object data, and the data or voice message to generate a callback list.

2. The mobile device of claim 1, wherein the application data is retrieved using application programming interfaces.

3. The mobile device of claim 1, wherein the callback list comprises a smart reply message.

4. The mobile device of claim 1, wherein the callback integration engine receives a user confirmed callback list and executes the confirmed callback items on the list.

5. The mobile device of claim 1, wherein the application data comprises data from communication, social media, financial, gaming, and productivity applications.

6. The mobile device of claim 1, wherein the machine learning algorithms comprise natural language processing.

7. A method for active callback prioritization, comprising the steps of:
receiving a data or voice message, the data or voice message comprising at least one characteristic;
producing a callback object in memory comprising information associated with the data or voice message received;
retrieving and aggregating application data related to the data or voice message;
using the callback object and the aggregated application data as inputs into one or more machine learning algorithms, wherein the machine learning algorithms analyze the callback object's information and the aggregated application data to determine the context and urgency associated with the data or voice message;
for each callback object, computing a priority score based at least upon the results of the analysis; and
using the computed priority score, the callback object data, and the data or voice message to generate a callback list.

8. The method of claim 7, wherein the application data is retrieved using application programming interfaces.

9. The method of claim 7, wherein the callback list comprises a smart reply message.

10. The method of claim 7, wherein a user confirmed callback list is generated and executes the confirmed callback items on the list.

11. The method of claim 7, wherein the application data comprises data from communication, social media, financial, gaming, and productivity applications.

12. The method of claim 7, wherein the machine learning algorithms comprise natural language processing.

* * * * *